United States Patent [19]
Hata

[11] Patent Number: 6,067,377
[45] Date of Patent: May 23, 2000

[54] COLOR IMAGE FORMING APPARATUS

[75] Inventor: Hiroya Hata, Fujisawa, Japan

[73] Assignee: Ricoh Company, Ltd., Tokyo, Japan

[21] Appl. No.: 08/717,327

[22] Filed: Sep. 20, 1996

[30]     Foreign Application Priority Data

Sep. 20, 1995  [JP]  Japan .................................. 7-266353
  Sep. 5, 1996   [JP]  Japan .................................. 8-255591

[51] Int. Cl.⁷ .............................. G06K 9/00; G03F 3/08
[52] U.S. Cl. .......................... 382/167; 382/255; 358/518
[58] Field of Search ................................... 382/162, 163,
                382/165, 167, 190, 199, 201, 202, 203,
                243, 257, 256, 258, 259, 274, 275, 266,
                254, 255; 358/515, 516, 517, 518, 519,
                520, 521, 461, 1.9, 1.6, 1.1

[56]            References Cited

U.S. PATENT DOCUMENTS

| | | | |
|---|---|---|---|
| 5,333,038 | 7/1994 | Mizoguchi et al. ..................... | 355/208 |
| 5,339,150 | 8/1994 | Hubble, III et al. .................... | 355/326 |
| 5,438,437 | 8/1995 | Mizoguchi et al. ..................... | 358/518 |
| 5,481,340 | 1/1996 | Nagao et al. ........................... | 355/246 |
| 5,734,801 | 3/1998 | Noguchi .................................. | 395/109 |

*Primary Examiner*—Madeleine Nguyen
*Attorney, Agent, or Firm*—Oblon, Spivak, McClelland, Maier & Neustadt, P.C.

[57]            ABSTRACT

An image forming apparatus having a correcting function for preventing toner from scattering around edge portions of line images. The image forming apparatus includes an image paper sheet formed from an original image for testing, a line width extracting unit for reading the image paper sheet for correcting and color-by-color extracting a state of toner scattering around edge portions of the line image. Color-by-color correcting data is then calculated based on the color-by-color extracted information. A line width correcting unit accomplishes correction based on the calculated result when subsequently forming ordinary images.

20 Claims, 22 Drawing Sheets

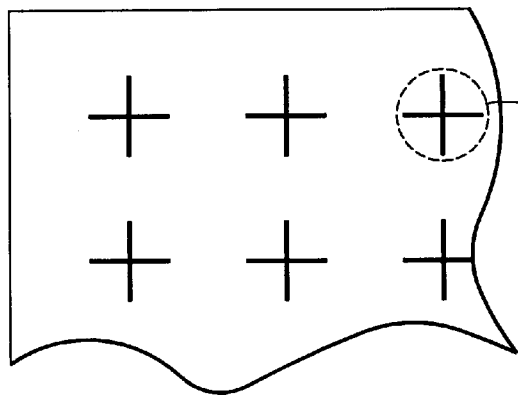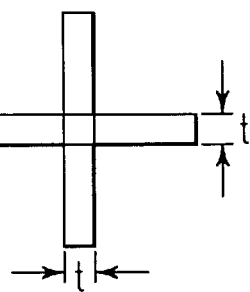
*FIG. 2A*  *FIG. 2B*
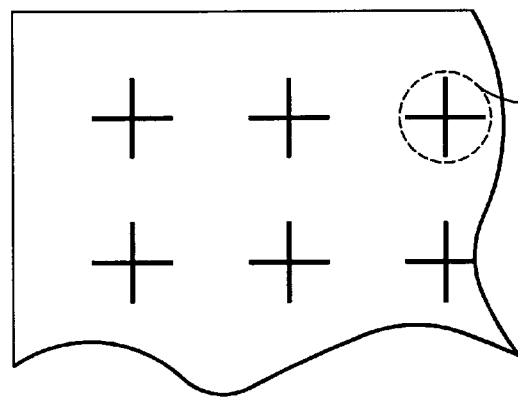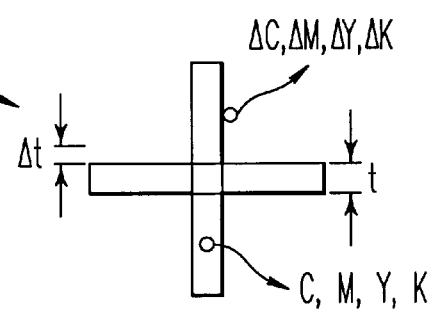
*FIG. 3A*  *FIG. 3B*

O: OBJECT PIXEL
B: BACKGROUND PIXEL

THE NUMBERS IN "⊘" REPRESENT
THE NUMBER OF PIXELS TO
BACKGROUND PIXEL

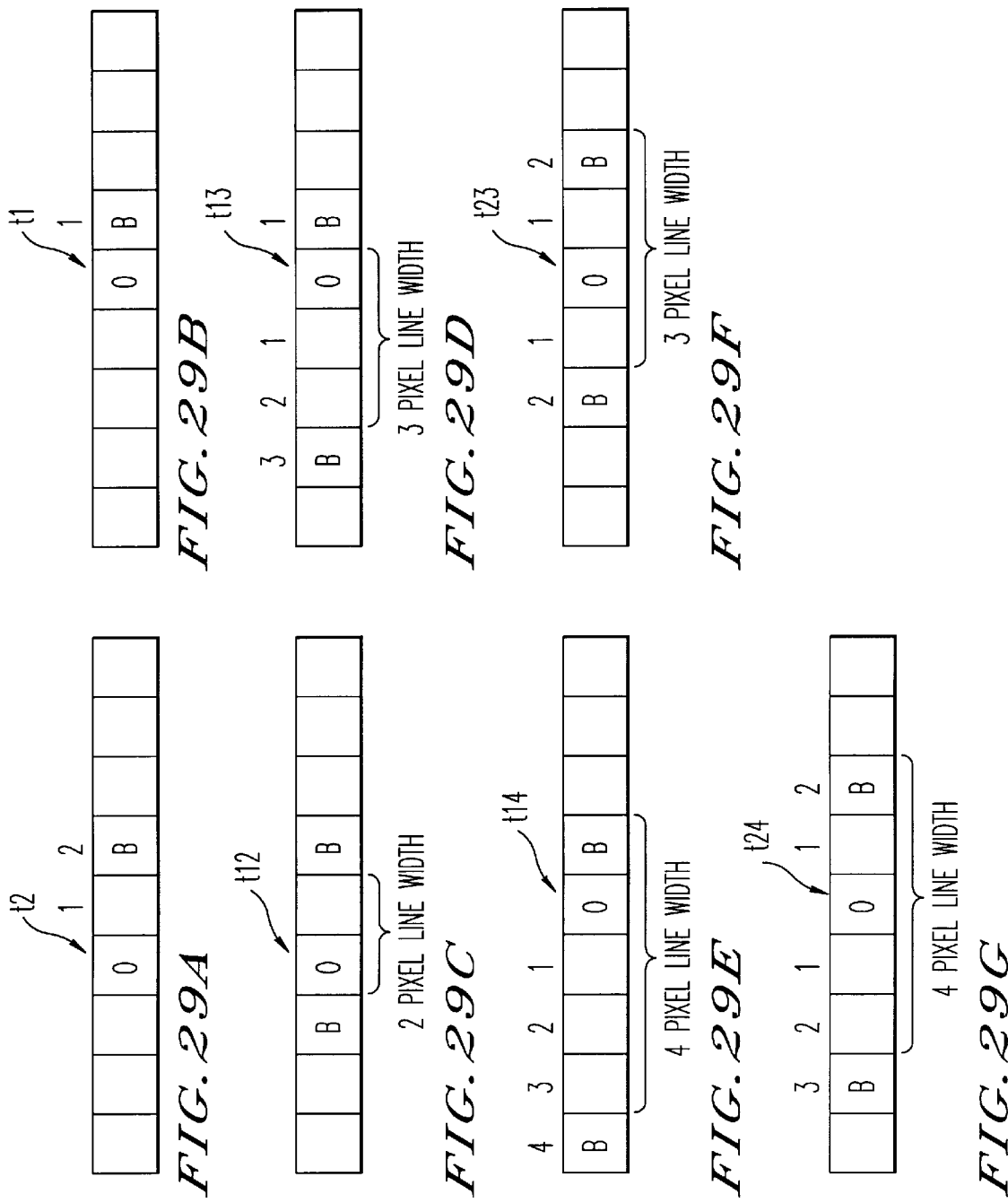

COLOR IMAGE FORMING APPARATUS

BACKGROUND OF THE INVENTION

1. Field of the Invention

The present invention relates to an image forming apparatus, such as an electrophotographic copying machine, a laser printer with a scanner, a facsimile machine, etc., and especially to an image forming apparatus capable of forming sharp images without toner scattering around edge portions of solid images or line images.

2. Discussion of the Background

In a color image forming apparatus, a plurality of color toners are laid one over another, and thereby a desired color image is obtained. However, as the color toners are laid one over another repeatedly, adhesion of the toners decreases as the toner colors are laid over one another, and thereby scattering of toner occurs around line image portions and an image tends to blur.

Conventionally, to prevent toner from scattering around line image edge portions, the toner amount of each color around the line image potions is uniformly controlled so as to decrease. Alternatively, an amount of black toner which is laid over increases more than that of the other toners, whereby it is possible to decrease the degree of toner scattering and changes of hue around edge potions of images. This type of operation is disclosed in, as an example, Japanese Laid Open Patent Number 5-207276.

As mentioned above, in the conventional apparatus, toner scattering can be decreased. However, in the operation in the conventional apparatus a toner image is formed more thickly than that of the original image, or a hue of edge portions of the image is blacker than that of the original image. Further, depending on the image forming apparatuses used, effects of the compensation are dispersed because the degree of correction is the same. Even in the same apparatus, a degree of the effects changes because of changes over time. Accordingly, it is difficult to provide a color image forming apparatus capable of forming distinct images with high quality without toner scattering.

SUMMARY OF THE INVENTION

Accordingly, one object of the present invention is to provide a novel image fixing apparatus capable of forming distinct images, irrespective of different image forming apparatuses and changes over time.

Another object of the present invention is to provide a novel image fixing apparatus capable of preventing toner from scattering around edge portions of line images.

These and other objects of the present invention are accomplished by a novel image forming apparatus having a correcting function capable of preventing toner from scattering around edge portions of line images. The image forming apparatus generates an image paper sheet on which an original image for testing is formed. A line width extracting unit reads the image on the image paper sheet, and corrects, on a color-by-color basis, a state of toner scattering around edge portions of the line image. Color-by-color correcting data is automatically calculated based on the color-by-color extracted information. A line width correcting unit then accomplishes correction based on the calculated result when forming ordinary images.

The color image forming apparatus may also generate an image paper sheet for correcting on which the original image for testing is formed, the image paper sheet then being scanned for correcting. A line thickness correcting unit can then extract differences of line widths between the original image for testing and the line image formed on the image paper sheet for correcting. The line thickness correcting unit automatically calculates color-by-color correcting data based on the extracted information, and then correction is accomplished so that the differences in the line widths do not occur based on the calculated result.

In the present invention, it is possible to accomplish correction for each color image forming apparatus color-by-color and to provide a color image forming apparatus capable of preventing toner from scattering and preventing changes of hue from occurring around image edge portions.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2(a) shows part of an original image for testing according to the first embodiment;

FIG. 2(b) shows an enlarged "+" pattern of the original image according to the first embodiment;

FIG. 3(a) shows part of an original image sheet for testing according to the first embodiment;

FIG. 3(b) shows an enlarged "+" pattern of the original image for testing according to the first embodiment;

FIG. 29 explains an operation according to the sixth embodiment of the present invention.

DESCRIPTION OF THE PREFERRED EMBODIMENTS

Figure 1:
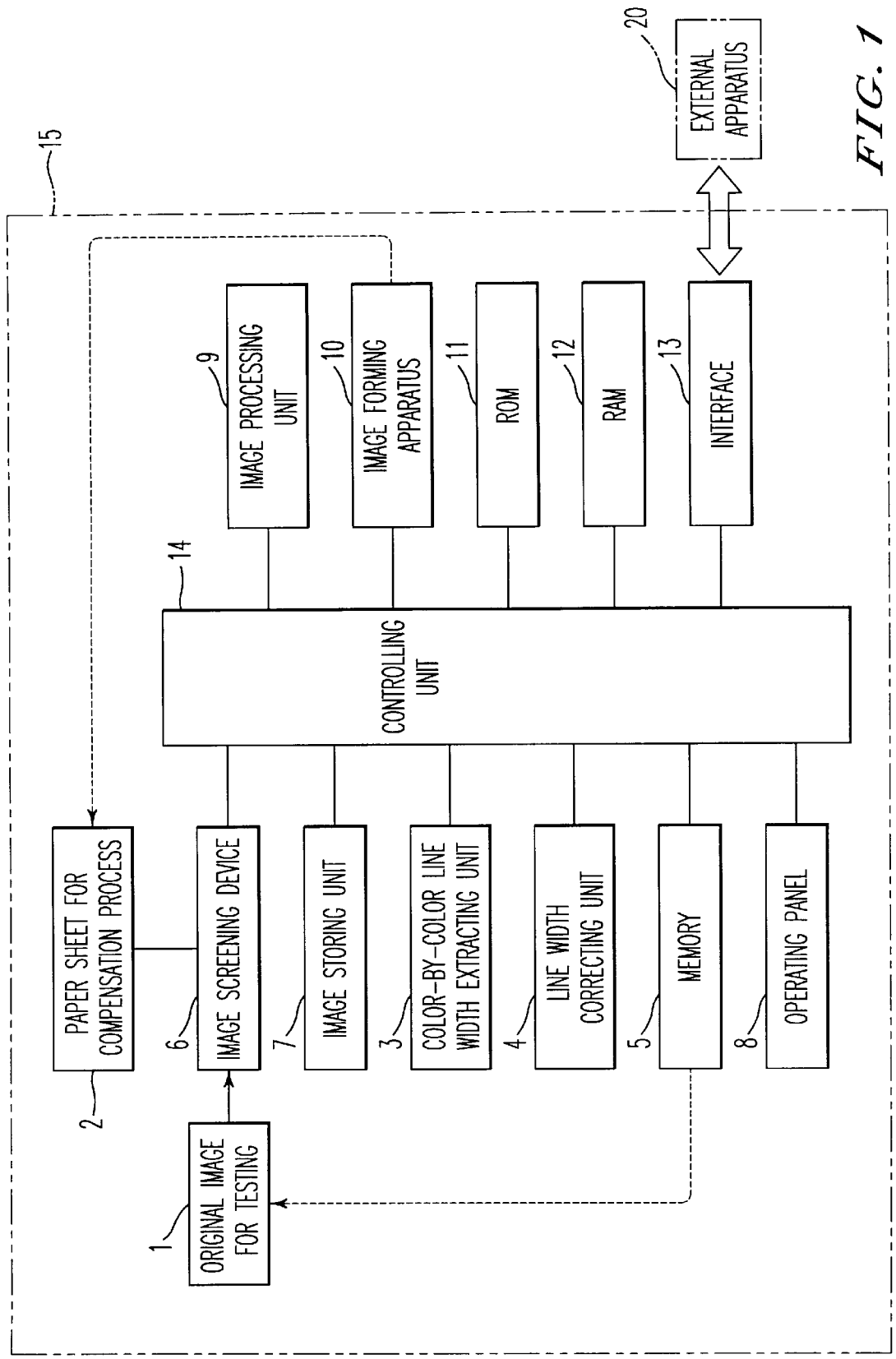
FIG. 1 is a block diagram of a color image forming apparatus according to a first embodiment of the present invention.

A description of the present invention will now be given below by referring to the following Figures, in which like reference numerals designate identical or corresponding parts throughout.

Using a color electrophotographic copying machine (hereinafter referred to as a color copying machine) as an example, a first embodiment of the present invention will now be described. Further, since details of functions or structures of the color copying machine are known, explanations thereof are omitted.

FIG. 1 shows a block diagram of a color copying machine 15 according to the present invention.

In the present invention as shown in FIG. 1, based on an original image 1 for testing, a paper sheet 2, which records the original image 1 for testing, and which is subsequently used for a correction or compensation process, is formed. That is, a first step in the present invention is to print out an original image 1 for testing onto a paper sheet 2, which is later used to evaluate the printing operation to allow for any needed compensation or correction in the printing process. A color-by-color line width extracting unit 3 detects toner scattering states around edge portions of line images by comparing the image on the paper sheet 2 with the image for testing 1. A line width correcting unit 4 performs a compensation so as to decrease toner scattering around the edge portions. A memory 5 stores the images for testing. An image scanning device 6, such as a scanner, an image storing unit 7, an operating panel 8, an image processing unit 9, an image forming apparatus 10, ROM 11, RAM 12, and an interface 13, which connects the main body of the color copying machine 15 to an external apparatus 20, such as a computer, are connected to a controlling unit 14 as well as the color-by-color line width extracting unit 3, the line width correcting unit 4 and the memory 5.

An operation and process according to the present invention of FIG. 1 will now be described.

First, the original image 1 for testing is read into, e.g. scanned by the image scanning device 6, the color copying machine 15, and then the read in image is stored in the image storing unit 7 and processed by the image processing unit 9. An image is then formed on the paper sheet 2 by the image forming apparatus 10, this image formed on paper sheet 2 representing original image data 1 as printed out. The paper sheet 2 for compensation is then set on a contact glass of the color copying machine 15 and is scanned by the image scanning device 6, and then the scanned image data is stored in the image storing unit 7. The color-by-color line width extracting unit 3 compares the scanned image data from the paper sheet 2 with the original image data for testing 1 (that is, compares the line widths of the scanned data from paper sheet 2 for compensation with the line widths of the image data for testing 1). Differences between these compared line widths are extracted for each color and stored in the image storing unit 7 or the RAM 12.

The line width correcting unit 4 then calculates color-by-color correcting data which will allow obtaining a desired image based on the difference information of the line width and images adjacent to the line width, and then transmits the calculation results to the image processing unit 9. In the image processing unit 9, using the calculated color-by-color correcting data, an image forming process of an original image to be copied is accomplished. It is also possible to confirm the result of the correcting process by again forming the image on a paper sheet after the correcting process, but this step can be omitted.

To distinguish the image for testing from a non-testing image for copying, an indication mark or a pattern can be formed on the paper sheet 2 for compensation so that the color copying machine 15 can automatically recognize the mark or pattern when the scanning device 6 reads the mark or pattern. When the color copying machine 15 identifies the mark or pattern and the scanned paper sheet is for testing, an image is formed as an image paper sheet 2 for compensation. Alternatively, it is possible to form the paper sheet 2 for compensation by scanning an original image 1 for testing if a special key of the operating panel 8 is pressed.

If the memory 5 (or the ROM 11, or the RAM 12 or another storing medium) stores the original image 1 for testing, it is not necessary to keep the paper sheet for testing. That is, the original image 1 for testing can be formed on a paper sheet or stored as code information in a memory or recording medium. Accordingly, it is possible to omit the operations of setting and scanning the original paper sheet 1 for testing on the contact glass every correction, and to correct line image data immediately anytime.

Moreover, it is possible to semipermanently store the data, so that the data are not lost or to prevent dirt or the like from forming on an original paper sheet for testing.

However, in the present invention, the original image 1 for testing can be maintained as a printed paper sheet with a specific test pattern. In this case, it is easy for an operator to see the formed image paper sheet for correcting, the paper sheet on which the corrected color image is formed, and a degree of the effects of the correction.

The controlling unit 14 has a microprocessing unit having functions for recognizing pressed keys of the operating panel 8, transmitting signals form the above mentioned units in synchronization with signals from these units and monitoring the units to ensure that the units are operating normally. Programs of the microprocessing unit of the controlling unit 14 are stored in the ROM 11. As mentioned above, the ROM 11 can be used for storing the original image data 1 for testing. Results of the calculation of the microprocessing unit are temporarily stored in the RAM 12.

The interface 13 is used for connecting the color copying machine 15 to an external apparatus 20, such as a computer, and thereby it is possible to receive from and transmit image data to the external apparatus 20.

FIGS. 2 to 7 further illustrate and explain the correction operations according to the present invention.

FIG. 2(a) shows an example of an original image 1 on a sheet for testing. In this case, a "+" pattern is drawn. The enlarged pattern is shown in FIG. 2(b) in which the notation "t" refers to a width of the lines in this "+" pattern. FIG. 3(a) shows a paper sheet 2 for compensation which is formed by reading the original image 1 for testing in FIG. 2 by the color image forming apparatus 15, and printing this original image 1 for testing on a paper sheet. By evaluating this printed image for compensation on paper sheet 2 in comparison with the original image 1, the printing process can be evaluated, and thereby toner scattering and hue evaluation can be judged. The read image data for testing are stored in the memories. In general, as shown in FIG. 3(b), the line width "t" of the formed image on the paper sheet 2 is larger than the original image 1 by a scattering width "Δt". That is, the printing process may introduce toner scattering in printing out the original image for testing 1, the toner scattering being represented by the width "Δt". The present invention then operates to evaluate this scattering width "Δt", and then take steps to correct for this scattering width "Δt".

The image which has been formed on the paper sheet 2 is then scanned by scanner 6 in the color image forming apparatus 15 and is temporarily stored as image data for correction. Then, the stored image data for correction are compared with the original image data 1 for testing. In this comparison process, the color-by-color line width extracting unit 3 extracts, on the line width "t", scattering width information ΔC, ΔM, ΔY and ΔK color-by-color (cyan, magenta, yellow and black) and the scattering widths ΔC, ΔM, ΔY and ΔK are stored in the image storing unit 7.

Comparing the image data for testing 1 with the image data obtained from paper sheet 2 for compensation provides a comparison between the scattering widths "Δt" and "t", i.e. this comparison indicates the amount of toner scattering for each color toner. Ideally, Δt would be zero.

If "Δt" is accurately obtained from the image data, as determined by their being no differences when comparing the image paper sheet 2 for compensation with the original image data 1, storing the image data for testing and the comparison are omitted.

FIG. 3(b) shows the color data including the color information C, M, Y and K and including the color-by-color information ΔC, ΔM, ΔY and ΔK in the scattering width Δt.

The line width correcting unit 4 generates correction data to eliminate the scattering widths Δt for each color, using the color-by-color scattering widths ΔC, ΔM, ΔY and ΔK of the scattering width information Δt.

After the scattering width data is determined, a procedure for extremely reducing scattering toner around line edge portions, i.e. entirely reducing toner on the line image, or reducing toner around edge portions of the line image, can be implemented. These procedures are now described in detail below.

Figure 4:
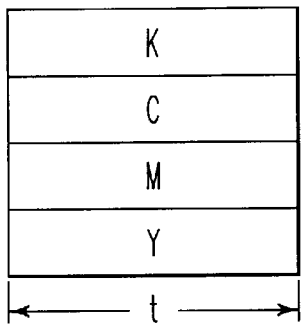
FIG. 4 is a diagram showing non-corrected color-by-color toner amounts according to the first embodiment.

FIGS. 4 and 5 are diagrams illustrating procedures for generating correction data so as not to compensate for the scattering width Δt by reducing toner amounts.

Assume that, as shown in FIG. 4, color toners C, M, Y and K for the line image with the width "t" are used when forming the image paper sheet 2 for compensation by forming the "+" pattern of the original image 1 for testing in FIG. 2, as well as in an ordinary image forming operation. The heights of the color toners represent toner amount. In a case that the scattering width Δt occurs as shown in FIG. 3(b), it may be efficient to eliminate such toner scattering by controlling the toner amounts as shown in FIGS. 5(a) through 5(d).

Figure 5A:
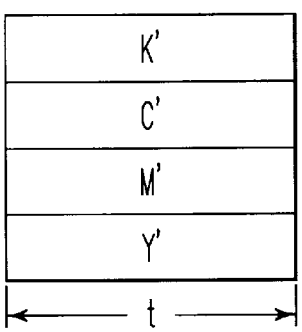
FIGS. 5(a) to 5(d) are diagrams showing corrected color-by-color toner amounts in the case of image forming according to the first embodiment.

That is, in FIG. 5(a), the amount of color toners C', M', Y' and K' respectively is reduced over the line width "t", as evidenced by comparing the heights of each color toner in FIG. 5(a) to that shown in FIG. 4.

Figure 5B:
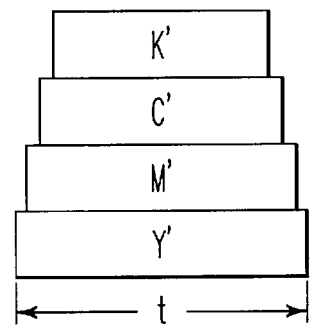

In FIG. 5(b), although the heights (amount) of the toners are the same as in FIG. 4, the length "t" of the line image of the color toners is different in the width direction, whereby the amount of the toners is controlled.

Figure 5C:
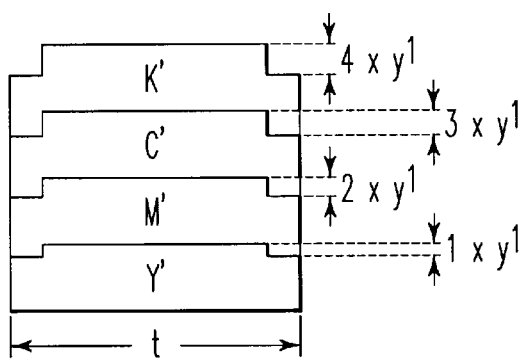
Figure 5D:
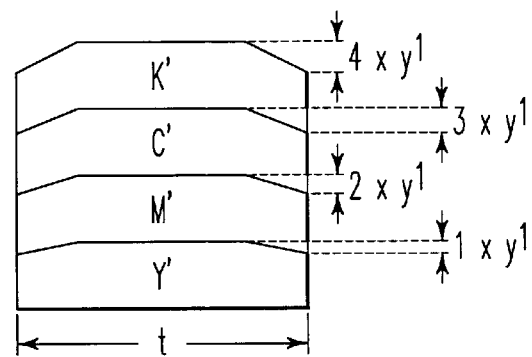

FIG. 5(c) shows a case where only toner amounts y1 of the edge portions of each color is decreased. FIG. 5(d) illustrates a diagram showing tapering of each toner color by y2 toward edge portions.

FIGS. 5(b) to 5(d) show cases in which the amount of each toner is the same as one another in the sectional views as in FIG. 4. However, in the present invention it is possible to independently change the heights (amount) of each color toner to be different to get an optimal value of toner amount based on the color-by-color information of width "t", C, M, Y and K and the scattering information ΔC, ΔM, ΔY and ΔK. With this operation in the present invention, it is possible to extremely reduce or prevent toner for each color from scattering in the width Δt portion.

Depending on which procedure of reducing toner shown in FIGS. 5(a) to 5(d), or another procedure of reducing toner, is chosen, the effects would vary slightly. Accordingly, if preparing toner amount patterns as shown in FIGS. 5(a) to 5(d), it is possible to always obtain a high quality image by selecting an optimum pattern when forming an image. The optimum pattern can be selected based on the form of the original image (i.e. letters, pictures and photographic pictures) to be read. As examples, when the original image includes sentences, i.e. characters, it is easy to read if edge portions of the width "t" are relatively sharp. In the case of a photograph or like, it is preferable to enhance appearance such that the edge portions change smoothly. The pattern may thus be selected based on the original image.

Figure 6:
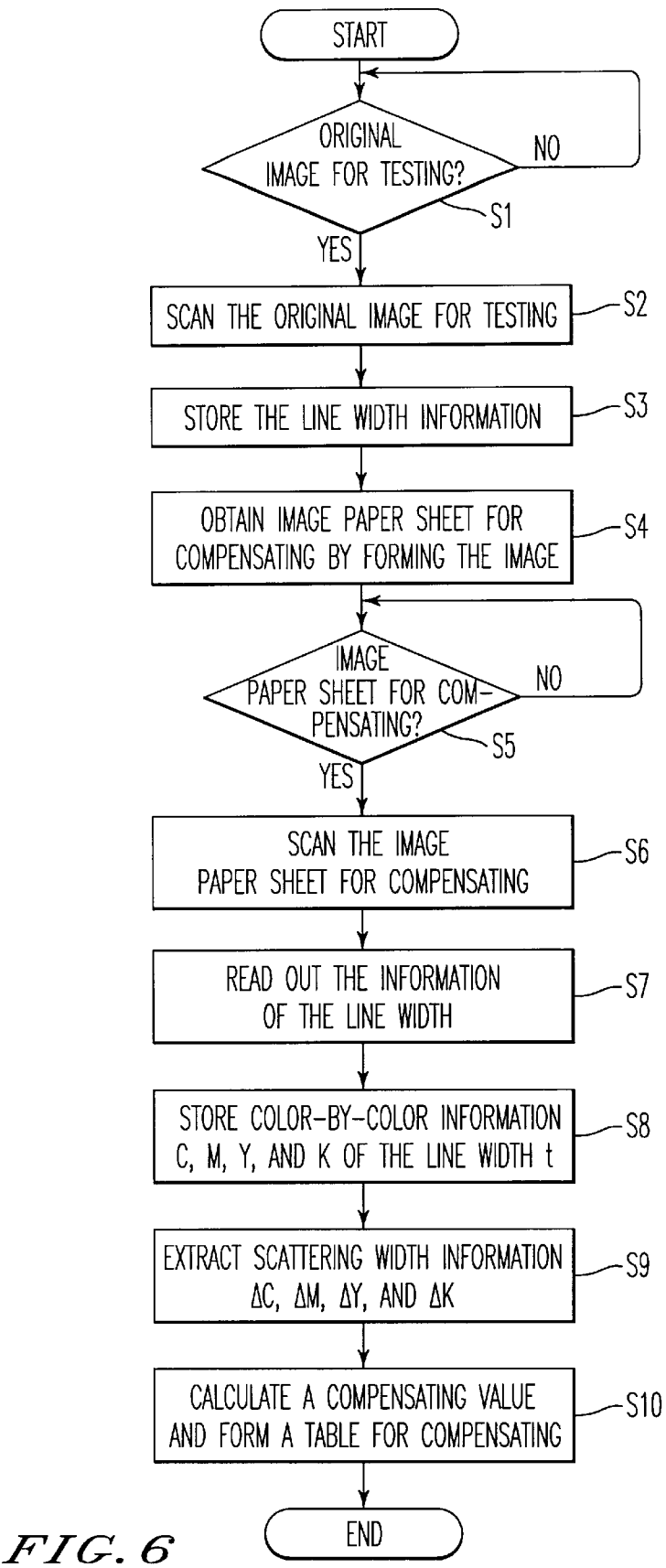
FIG. 6 is a flow chart of a main operation of forming a correcting table for eliminating scattering widths using the color image forming apparatus according to the first embodiment.
Figure 7:
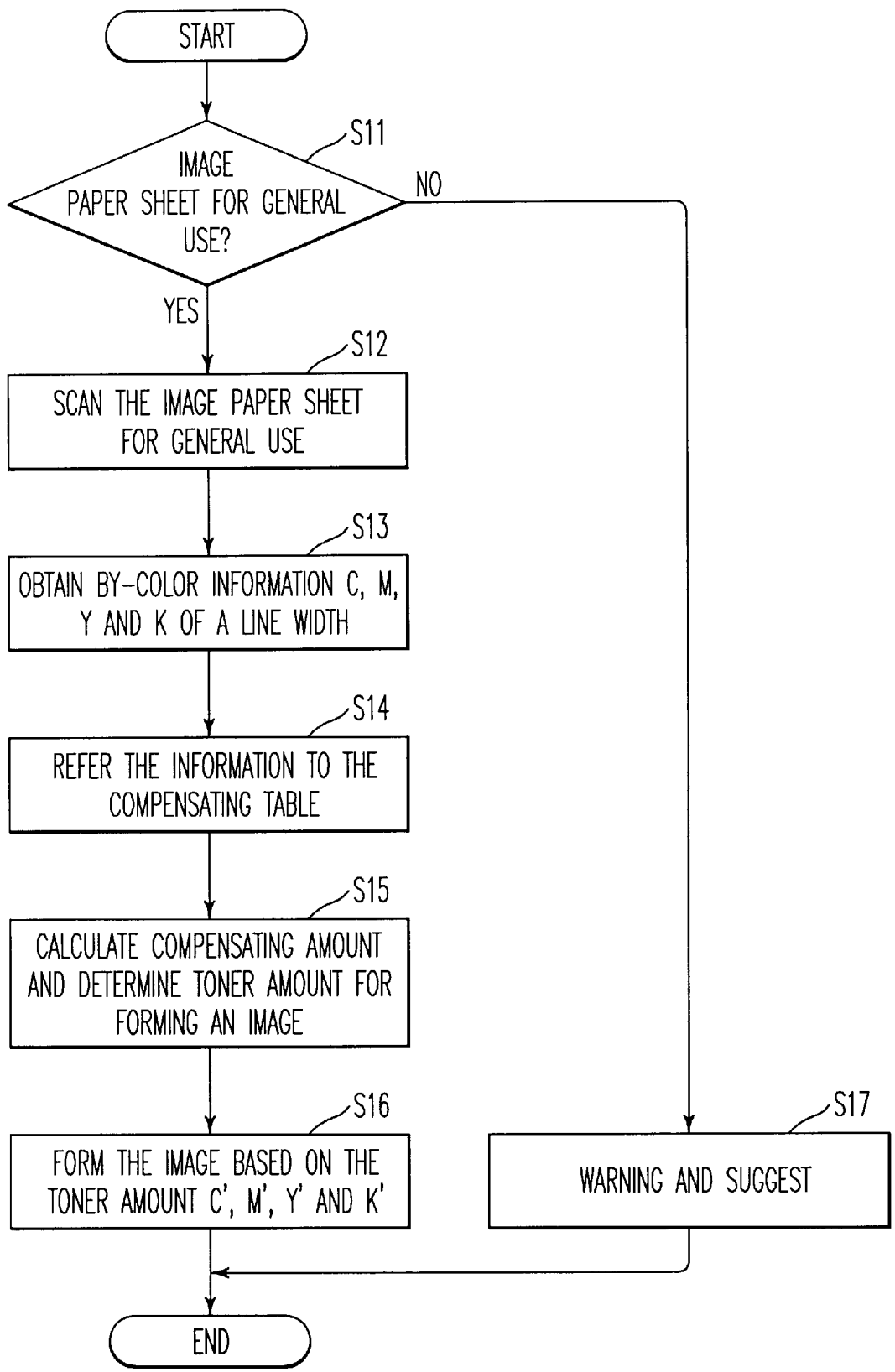
FIG. 7 is a flow chart showing a main operation of reading and correcting an original image for general use according to the first embodiment.

FIGS. 6 and 7 show flow charts illustrating an example of a main control operation which can be applied to the first embodiment of the present invention.

FIG. 6 is a flow chart showing an operation for forming a line image correcting table. When the original image 1 for testing is set, Yes in a step S1, a reading in operation, e.g. scanning, starts in a step S2 and information of the line width "t" of the original image 1 is stored in the image storing unit 7 in a step S3. Subsequently, the original image 1 information stored in the image storing unit 7 is printed out on a paper sheet as an image paper sheet 2 for compensation in a step S4. When the paper sheet 2 with the image for compensation is placed on the contact glass for scanning, Yes in a step S5, a scanning operation starts in a step S6. The information of the line width "t" in the original image 1 for testing is then read out of the image storing unit 7 in a step S7.

Based on the information read from the image storing unit 7, the color-by-color line width extracting unit 3 extracts color-by-color information C, M, Y and K of the line width "t" in a step S8, and color-by-color information ΔC, ΔM, ΔY and ΔK of the scattering width Δt in a step S9, and the information of the line width "t" and the scattering width Δt is stored in the image storing unit 7. The line width correcting unit 4, based on the obtained color-by-color information C, M, Y and K of the line width "t" and ΔC, ΔM, ΔY and ΔK of the scattering width Δt, then calculates correction values to prevent the line width Δt portion from occurring upon subsequent image formation operations, and forms a table for correction in a step S10 which stores such correction values. The operation is thereby completed.

FIG. 7 shows a flow chart for a case of reading an original image for an ordinary subsequent copying operation after the operation in FIG. 6 is completed and the correcting table is formed.

In FIG. 7, if the original image 1 for testing or for compensation is read, No in a step S11, an operator is warned and informed that he or she should read an image paper sheet for the ordinary operation in a step S17. As discussed above, in the present invention a special identification mark may be placed on such an image sheet for testing, which special identification mark can be detected in this step S11. When the image paper sheet for the ordinary operation general use is set, Yes in a step 11, a scanning operation starts in a step S12. If a line image is found (and at the time color-by-color information C1, M1, Y1 and K1 has been obtained) in a step S13, the table for correction is referred to without outputting an image in a step S14, and then an appropriate toner amount C', M', Y' and K' for forming an image is determined in a step S15. An image is then formed on a paper sheet according to the determined toner amount C', M', Y' and K' in a step S16, whereby it is possible to form the image without any scattering width Δt.

In the above-mentioned examples, procedures for reducing toner can be accomplished by conventional ways.

For example, it is possible to reduce toner amount by controlling a light exposing amount during an image forming operation, i.e. charging, exposing, developing, transferring and fixing. A scanned image is converted into image signals based on an intensity of light, and the converted image signals are led onto a uniformly charged photoconductive element (e.g. a drum or belt). This intensity is controlled based on the correcting values determined by the present invention, whereby attaching the amount of toner on the photoconductive element varies upon developing, whereby it is possible to easily reduce an amount of toner.

It is also possible to easily reduce toner around edges of the line image by forming dots every two dots around the edges of the line image. There are alternative procedures for reducing toner amount, and one of these procedures can be used to obtain the desired effects.

Accordingly, in the present invention the correction is not affected due to the apparatus used, and it is possible to prevent toner from scattering. Further, toner scattering does not occur around edge portions of the line images and hue differences from the original images do not occur.

A description of a second embodiment of the present invention will now be explained.

Figure 8:
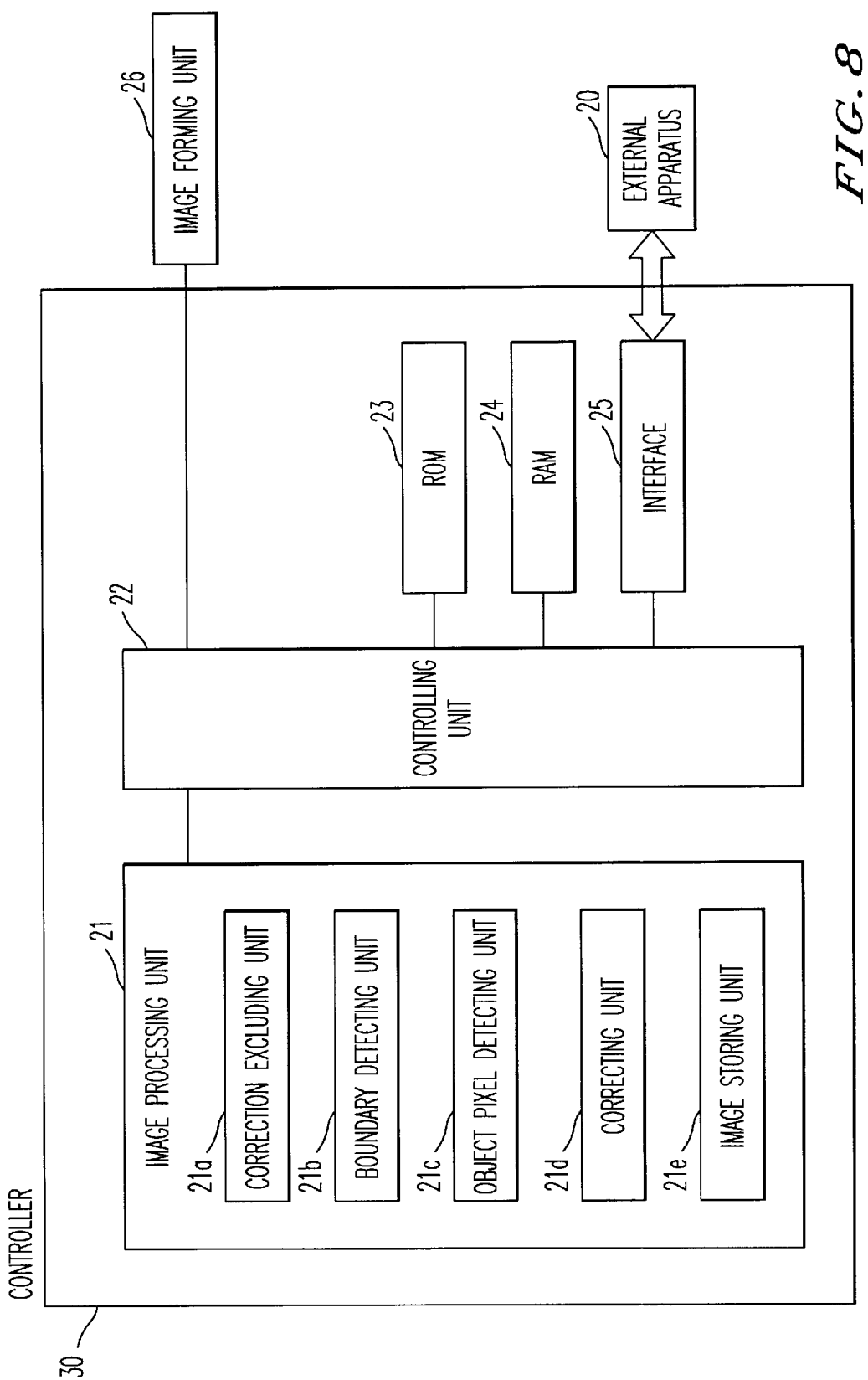
FIG. 8 is a block diagram of a color image forming apparatus according to a second embodiment of the present invention.

FIG. 8 illustrates a block diagram showing a color image forming apparatus according to the second embodiment.

The color image forming apparatus includes a controller 30 and an image forming unit 26. The controller 30 includes an image processing unit 21, a control unit 22, ROM 23, RAM 24 and an interface 25. An external apparatus 20, such as a personal computer 20, is connected to the controller 30 of the color image forming apparatus via the interface 25.

The image processing unit 21 is formed of a correction excluding unit 21a, a boundary detecting unit 21b, an object pixel detecting unit 21c, a correcting unit 21d and an image storing unit 21e.

The correction excluding unit 21a excludes predetermined color data from a correction operation. The boundary detecting unit 21b detects a boundary between a background pixel and a non-background pixel. The object pixel detecting unit 21c detects a pixel distance from a non-background pixel to be corrected, counting from the non-background pixel contacting the boundary detected by the boundary detecting unit 21b. That is, the object pixel detecting unit 21c counts the number of pixels from the object pixel to the boundary. The correcting unit 21d corrects a non-background pixel according to the result detected by the object pixel detecting unit 21c. On the image storing unit 21e, an image is formed based on image data input from the external apparatus 20.

The controlling unit 22 controls the entire color image forming apparatus by programs stored in ROM 23 using RAM 24 as a working area. The controller 30 can be used as a controller of an electrophotographic color printer or electrophotographic color facsimile instead of the color copying machine.

This second embodiment of the present invention has an operation to provide a correction based on a width of a line, and a relation of a pixel to an edge of the line. As a result, in this further embodiment of the present invention, correction values are based on detecting background pixels and non-background pixels.

A description of the basic operations and processing will now be given using a color image forming apparatus in which mono-color toner is used for each pixel and color images are formed by combining a plurality of color pixels. This is referred to as a side-by-side color image forming apparatus.

The controller 30 reads out every pixel formed on the image storing unit 21e in order and then executes processing so as to prevent toner from scattering in the image forming unit 26 when an image forming processing command is given from the external apparatus 20.

At that time, the correction excluding unit 21a obtains color information from each pixel and determines if the color of the pixel is one for which toner scattering occurs with the passage of time. The determining process is accomplished by deciding if the color data represents a predetermined color. If there is a function of forming a correcting table in the apparatus, such as in the first embodiment, it is possible to determine from the table if the color data is one for which toner scattering occurs. If the color is one for which toner scattering does not occur, the correction excluding unit 21a excludes the pixel data from an object of the correction, that is, does not process the data for correction and proceeds to another data to process.

Figure 9:
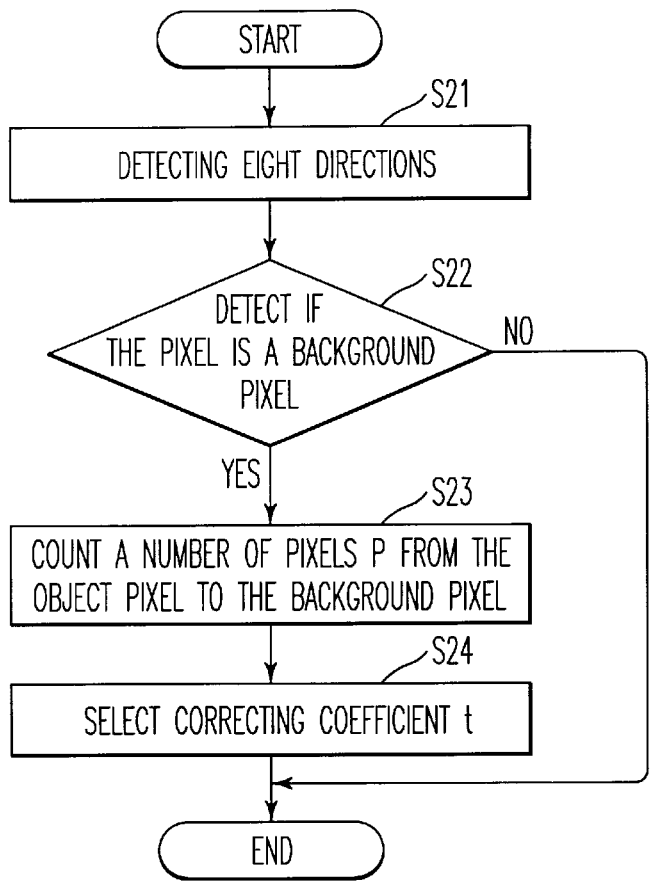
FIG. 9 is a flow chart showing a main operation of the second embodiment.

When determining whether the color of the pixel is a color for which scattering occurs, the correction excluding unit 21a carries out the process regarding the pixel as a processing pixel (object pixel) as shown in a flow chart of FIG. 9.

Figure 10:
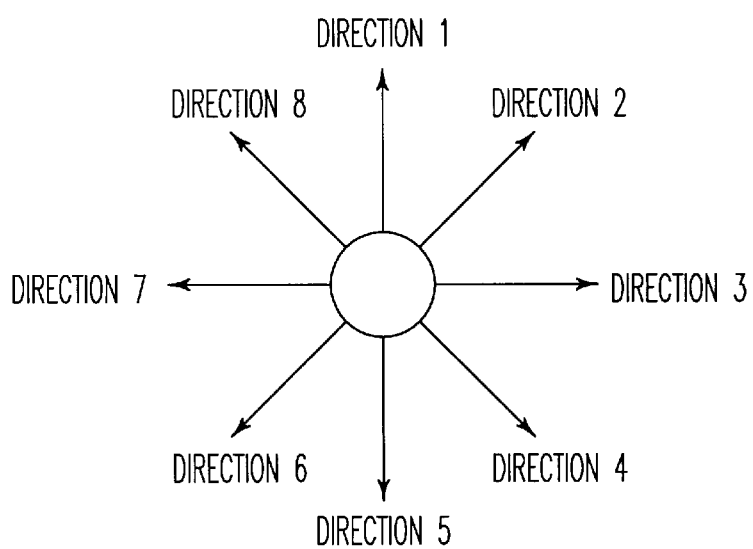
FIG. 10 is a diagram showing a pixel detecting direction from an object pixel according to the second embodiment.
Figure 11:
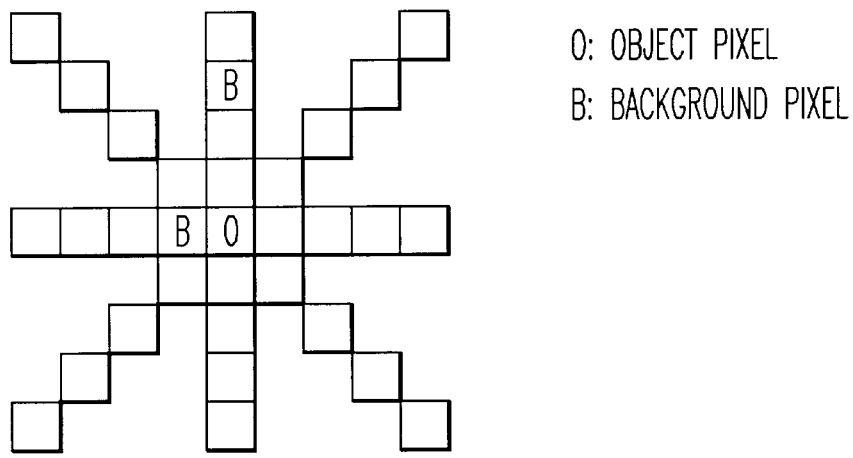
FIG. 11 is a diagram showing a direction of detecting pixels from the object pixel according to the second embodiment.

In FIG. 9, first, pixel data (digital data) surrounding the object pixel in eight directions are detected in a step S21. As shown in FIG. 10, the eight directions are defined and four pixels from the object pixel in each direction are detected as shown in FIG. 11.

Figure 12:
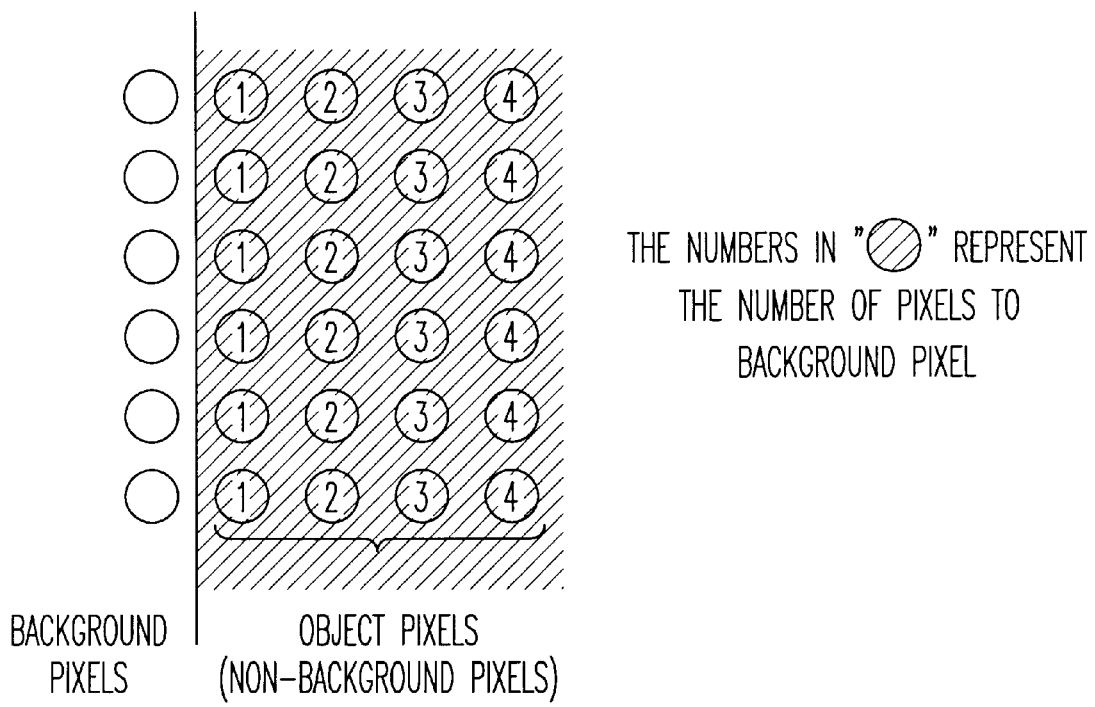
FIG. 12 is a diagram showing a relationship between a number of pixels from a background pixel to the object pixel for a correction according to the second embodiment.

It is determined if each pixel is a background pixel or a non-background pixel by comparing the pixel with a slash hold value (which is explained later) in a step S22. If no background pixel is found, No in the step S22, no process is executed on the object pixel and the process regarding another object pixel is then carried out. However, if a background pixel is found, Yes in the step S22, the number P of pixels from the object pixel to the closest background pixel is counted, that is, the number of pixels that the object pixel is away from the non-background pixel is determined by counting pixels from a non-background pixel located in a boundary contacting the background pixel to the object pixel in a step S23, see also FIGS. 11 and 12. A correction coefficient (t1, t2 or t3) is then selected based on the counted number P in a step S24.

Figure 13A:
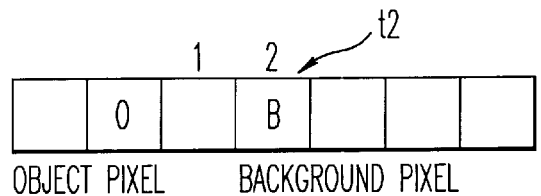
FIGS. 13(a) to 13(c) are diagrams showing regulation in the case of determining the correction based on the pixel number from a background pixel to an object pixel according to the second embodiment.
Figure 13B:
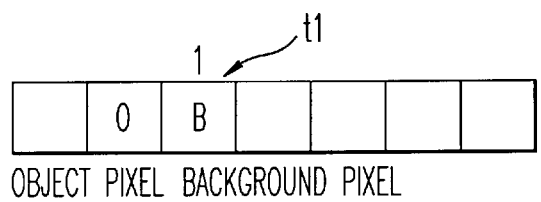
Figure 13C:
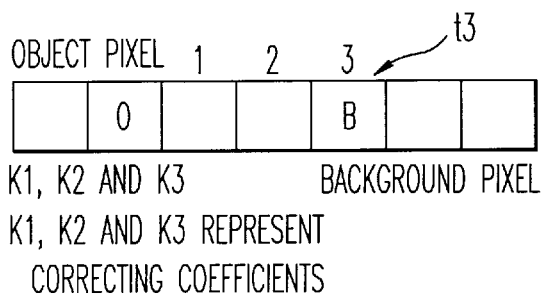

As a specific example, as shown in FIG. 13(a), if a background pixel is located in the second pixel from the object pixel, the correction coefficient t2 is selected. As shown in FIG. 13(b), if a background pixel is located in the first pixel from the object pixel, the correction coefficient t1 is selected. As shown in FIG. 13(c), if a background pixel is located in the third pixel from the object pixel, the correction efficient t3 is selected. In these cases, values of t1, t2 and t3 are set to gradually decrease.

Figure 14:
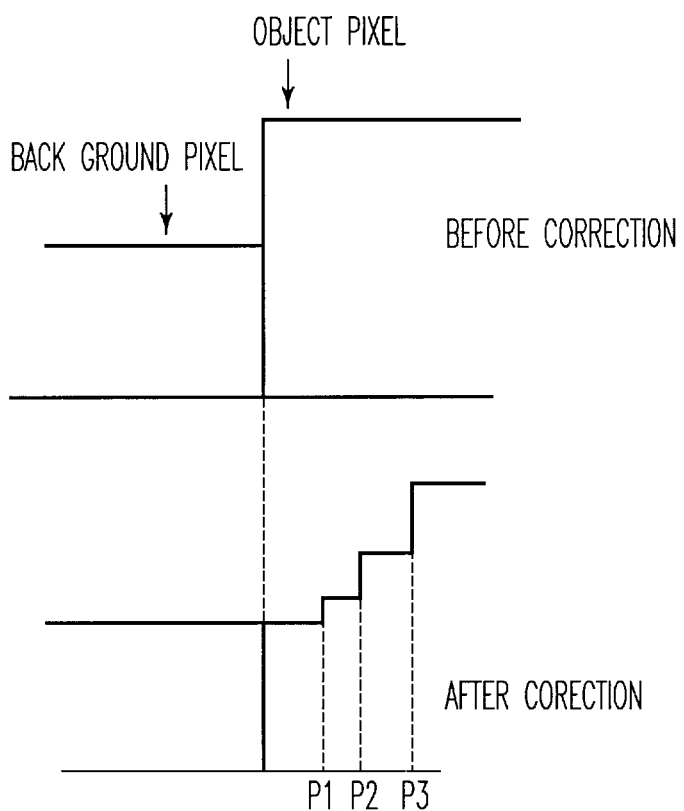
FIG. 14 is a diagram showing states before and after correction according to the second embodiment.

As shown in FIG. 14, the first to third pixels (non-background pixels) from the object pixel are corrected by using the correcting coefficients (t1, t2 and t3) determined in the above-mentioned way. FIG. 14 is an example for correcting toner amount, whereby it is possible to efficiently prevent toner from scattering around edge portions by correcting toner amount of image edge portions (boundary) as terraced. Thus, in this embodiment of the present invention, the toner amount decreases as an edge of the line is approached, to prevent toner scattering beyond the edge of the line.

In the step S22, whether the pixel is a non-background pixel is determined based on comparison with a slash hold value (S1) and a background pixel is determined based on a comparison with a slash hold value (S2), and the determination is carried out for each color (Y, M, C and K).

If a digital datum value (N) of one of the contacting pixels is more than the slash hold value (S1) (N>S1) and the digital datum value (N) of another of the pixels is smaller than that of the slash hold value (S2) (N<S2), it is decided that the one pixel is a non-background pixel and the other pixel is a background pixel.

Figure 15A:
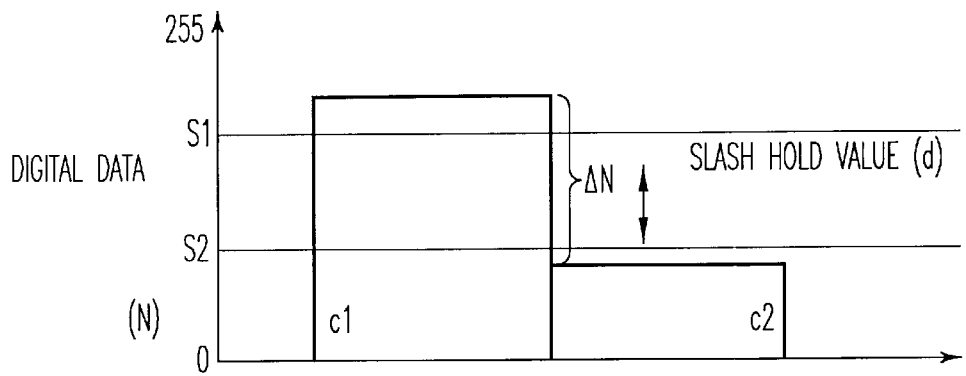
FIGS. 15(a) to 15(d) are diagrams showing ways of determining a background pixel and a non-background pixel based on a slash hold value according to the second embodiment.
Figure 15B:
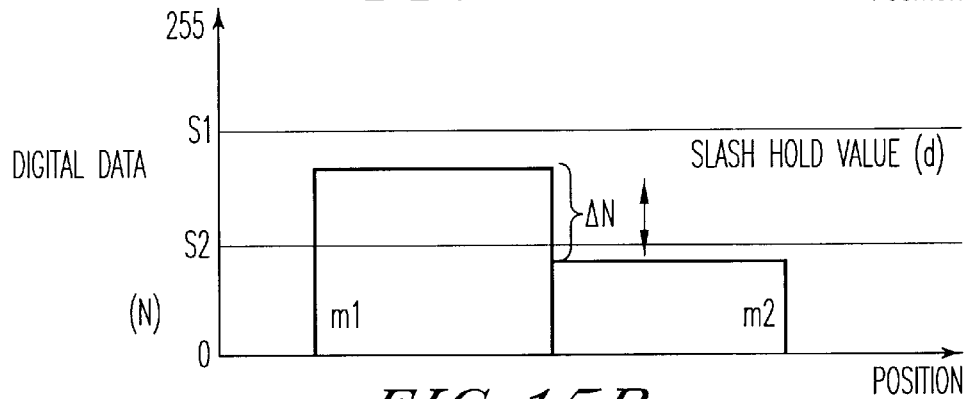
Figure 15C:
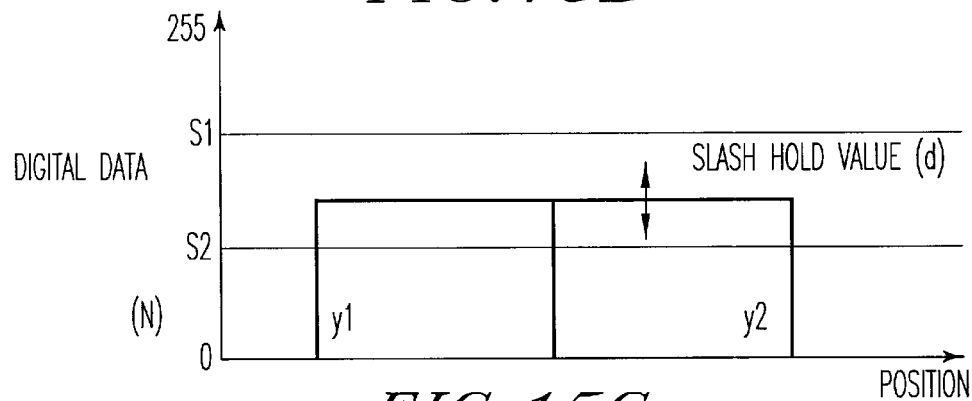
Figure 15D:
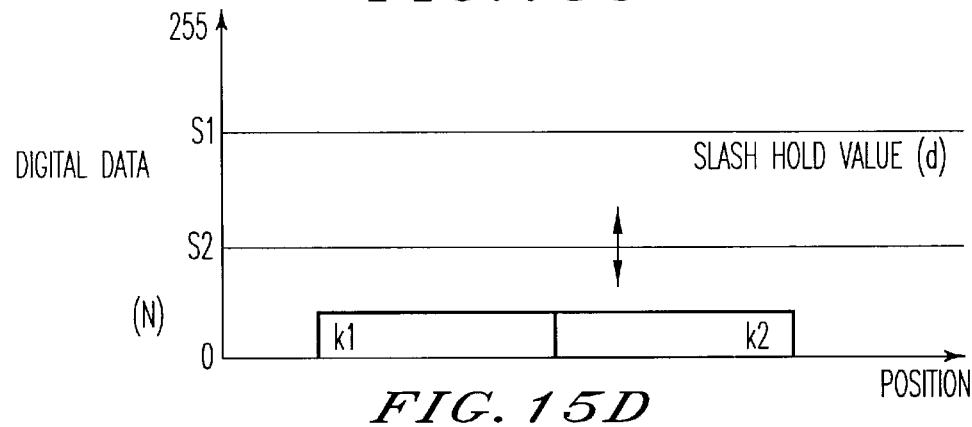

Accordingly, among the examples of FIGS. 15(a), 15(b), 15(c) and 15(d), only in FIG. 15(a) is it determined that a digital datum of cyan C1 of the FIG. 15(a) is a non-background pixel and a digital datum C2 is a background pixel.

It is possible to determine if there is a boundary of a non-background pixel and a background pixel between two pixels by comparing a difference between digital values N of contacting pixels with a slash hold value (d). In this case, it is determined that a boundary exists between pixels C1 and C2 in FIG. 15(a) and pixels m1 and m2 in FIG. 15(b).

According to this second embodiment, it is possible to shorten the operation time by excluding the predetermined color data from the correcting process and to efficiently prevent toner from scattering by changing a degree of the correction based on the pixel distance from a non-background pixel to the object pixel.

In comparison with the first embodiment, since it is not necessary to read the image paper sheet 2 for compensation in the second embodiment, and to detect toner scattering states around line images of the image paper sheet for correction, and to test color-by-color and calculate color-by-color correcting data based on the detected by-color information, paper sheets for testing are not wasted and it is possible to process the correction faster than in the first embodiment.

Furthermore, by using the side-by-side color image forming type of apparatus, it is possible to accomplish the correction for preventing toner from scattering color-by-color and to reduce the cost of the apparatus because of simplicity of the apparatus.

A third embodiment of the present invention will now be explained below.

Figure 16:
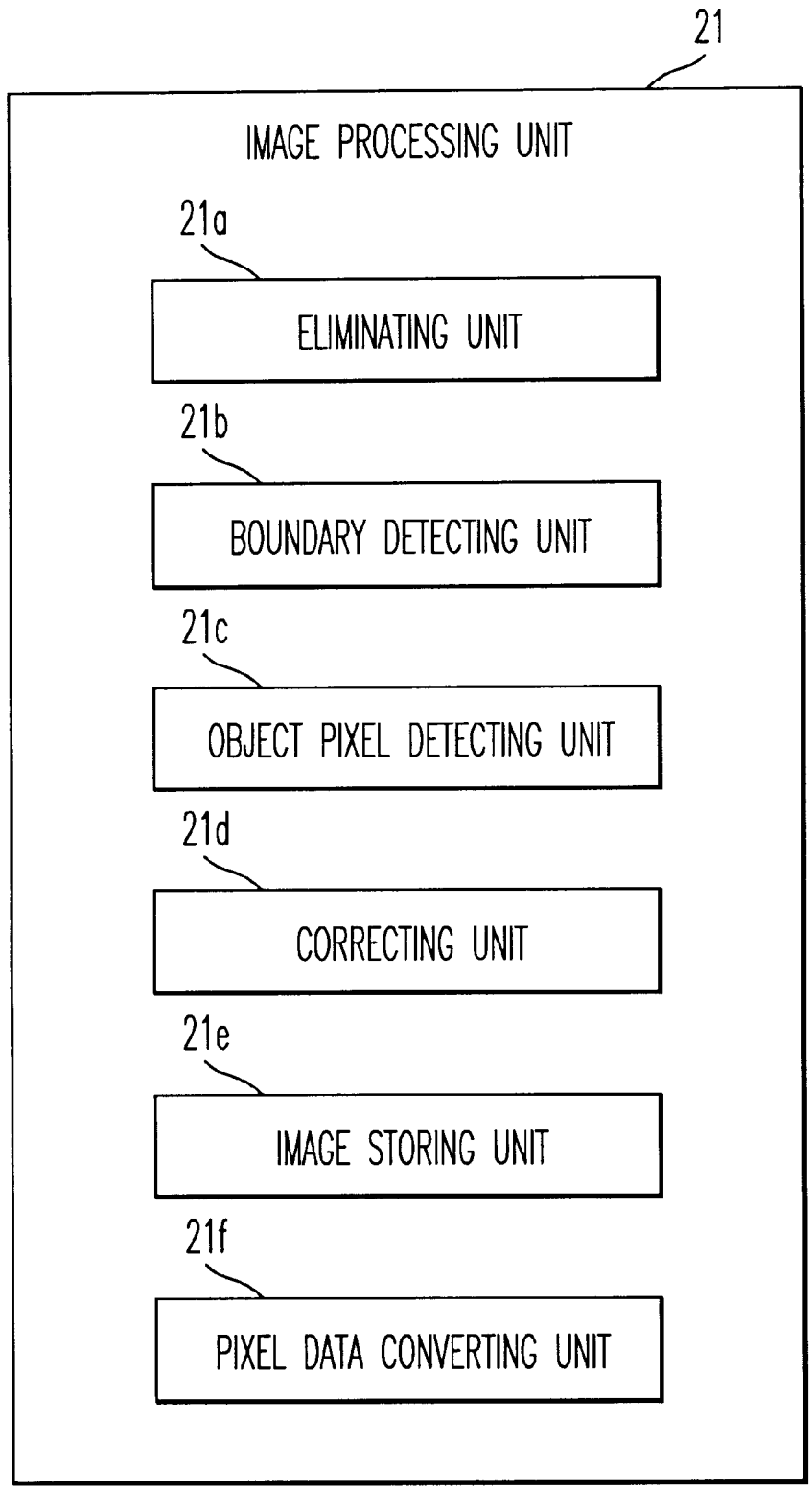
FIG. 16 is a block diagram showing a color image forming apparatus according to a third embodiment of the present invention.
Figure 18A:
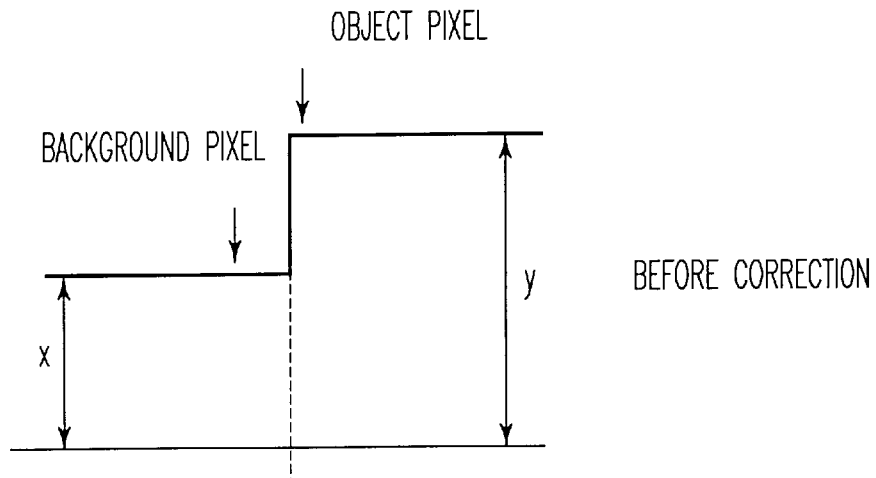
FIG. 18 is a diagram showing states before, during and after correction according to the third embodiment.
Figure 18B:
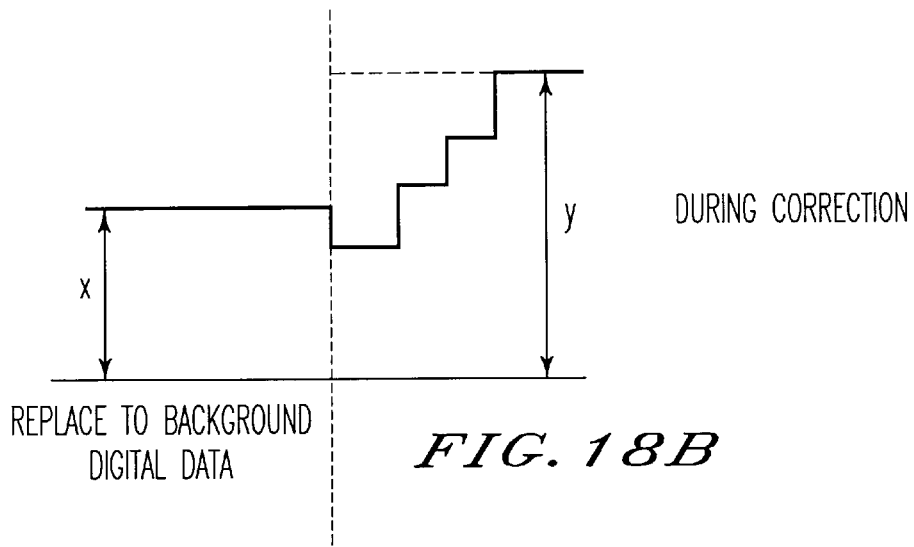

In the second embodiment, depending on combinations of the slash hold values and the coefficient, it can occur that corrected data of the object pixel (non-background pixel) are smaller than digital data value of a background pixel, see FIG. 18(b). To solve this problem, in the third embodiment, pixel data converting unit 21f is added in the image processing unit 21 of the controller 30 of the second embodiment as shown in FIG. 16.

The pixel data converting unit 21f compares a corrected result of a non-background pixel and a background pixel, and replaces the non-background pixel data with the background pixel data according to the result of the comparison.

Figure 17:
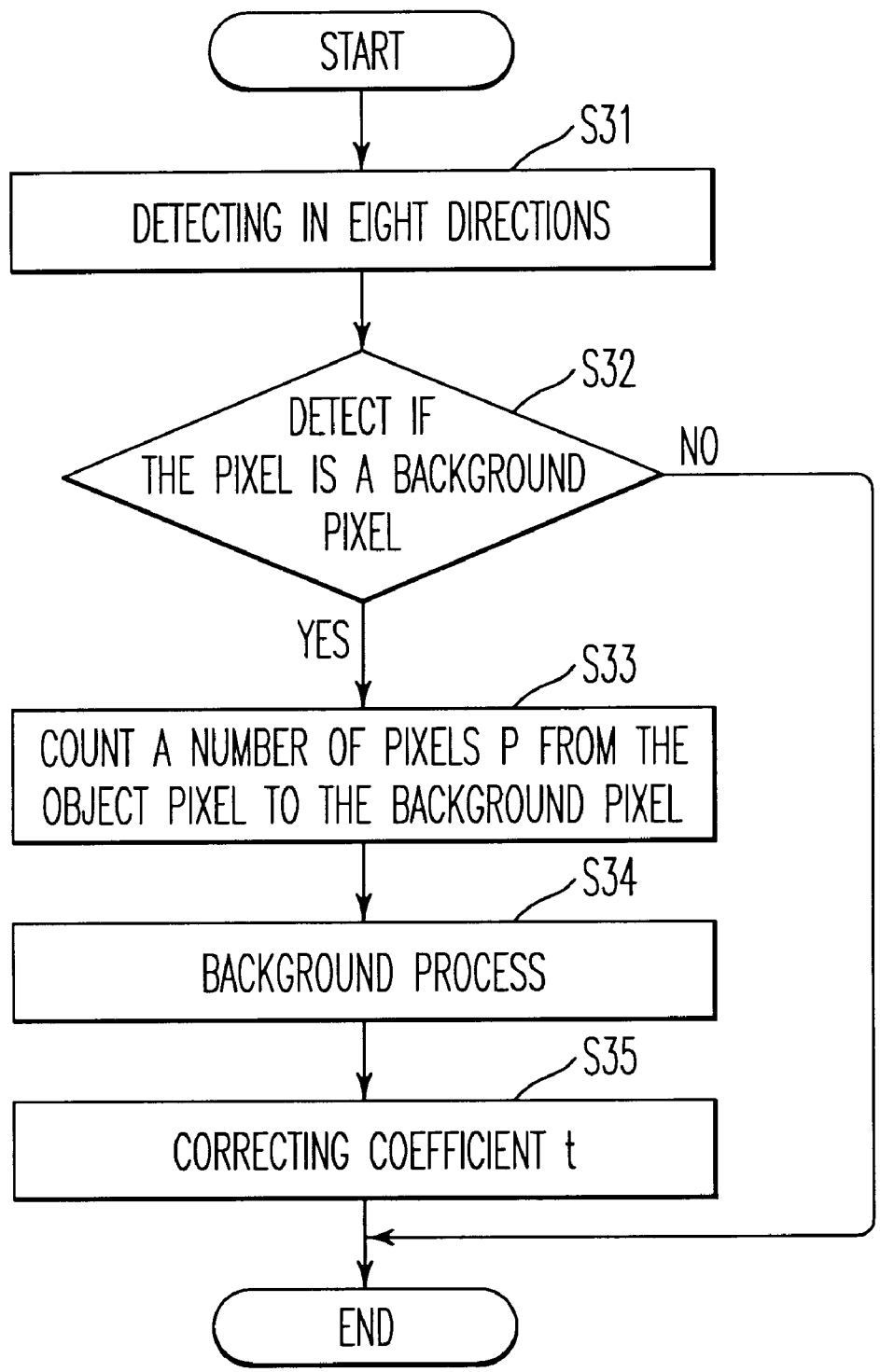
FIG. 17 is a flow chart showing a main operation according to the third embodiment.

FIG. 17 is a flow chart showing a process according to the third embodiment.

Figure 18C:
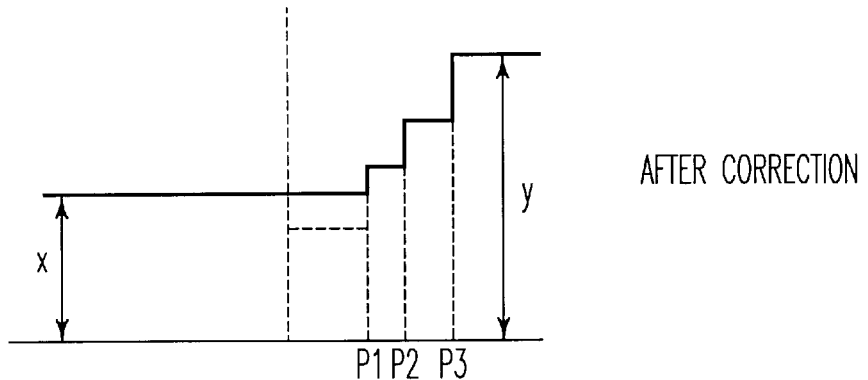

Steps S31 to S33 correspond to steps S21 to S23 of the second embodiment as shown in FIG. 9. In FIG. 17, in a continuing step 34, the result of the corrected object pixel data are compared with the background data, and if the corrected result of the object pixel is smaller than that of the background data value, see FIG. 18(b), the digital data of the non-background pixel are replaced with the digital data of the background pixel, see FIG. 18(c). After that, a correcting coefficient is determined depending on the number P of pixels from the object pixel to the background pixel in a step S35.

By adding the step S34, as shown in FIG. 18, it is possible to prevent digital data from getting smaller than that of the background digital data, and to therefore prevent the non-background pixel from getting lighter than that of the background pixel.

Next, in a fourth embodiment of the present invention, a color image forming apparatus in which a color image is generated by laying one color toner on top of another color toner is used. This is referred to as a color toner laying apparatus.

The structure of the color image forming apparatus in this fourth embodiment is the same as that in the second embodiment. However, since the image forming apparatus is of the color toner laying type, the image storing unit 21e has an image data forming area (hereinafter referred to as a plane) for forming each color image data. In this case, since four colors are needed to form a color image, there are four planes respectively for yellow, magenta, cyan and black in the image storing unit 21e.

A basic operation and process according to the fourth embodiment will now be explained.

There are two ways to determine if correction is accomplished at an object pixel. First, whether the object pixel is corrected is determined according to a color-by-color detected result of a background pixel. Second, whether the object pixel is corrected is determined based on a sum of digital data of all the color information.

Figure 19:
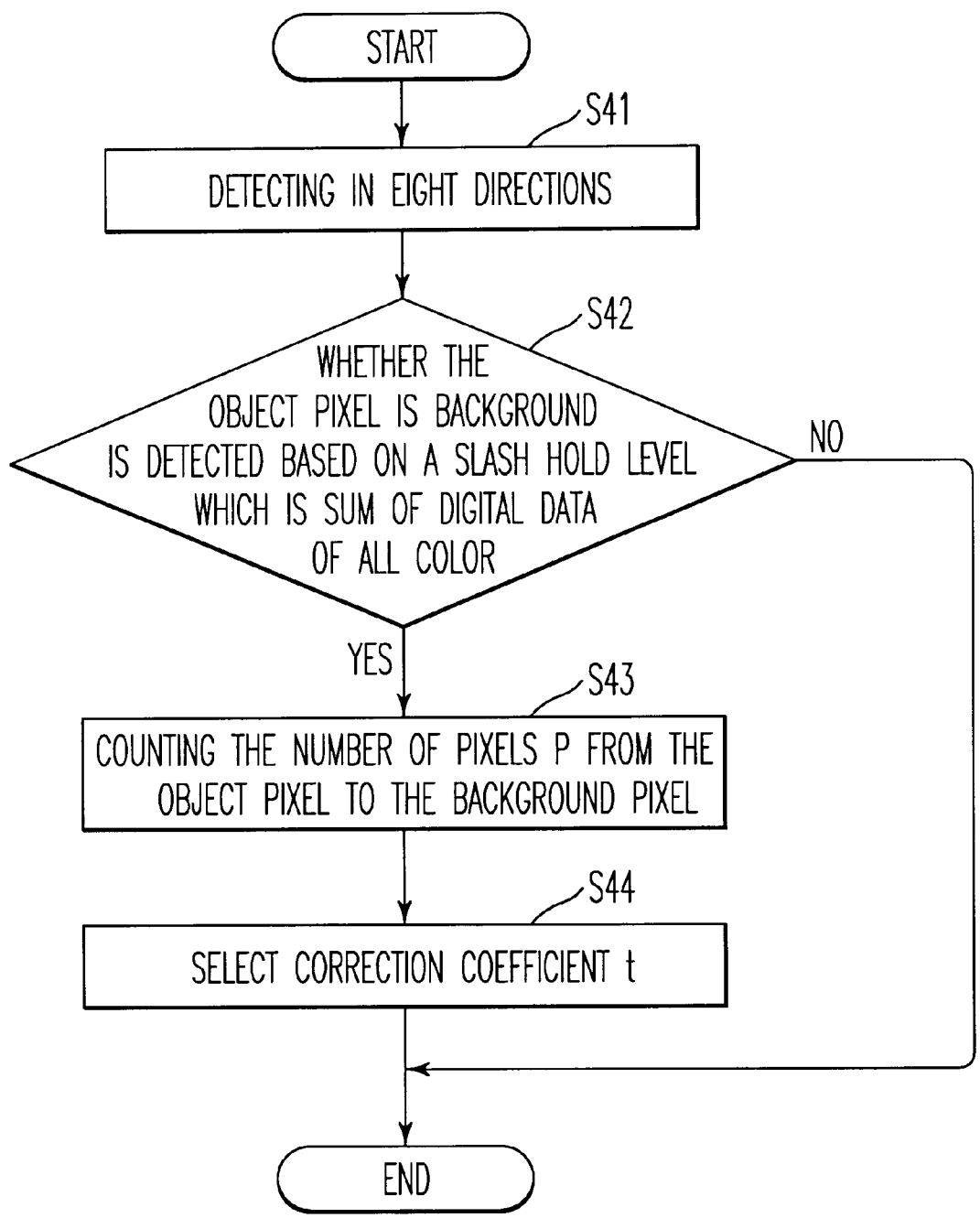
FIG. 19 is a flow chart showing a main operation according to a fourth embodiment of the present invention.

FIG. 19 is a flow chart showing an operation of the fourth embodiment.

In FIG. 19, pixel data (digital data) in eight directions surrounding the object pixel for each color plane are detected in a step S41. In this case, as in the second embodiment, the eight directions are defined as shown in FIG. 10 and four pixel data from the object pixel to the fourth pixel in each direction are detected as shown in FIG. 11.

Whether each pixel on each plane is a background pixel or non-background pixel is determined based on each slash hold level which is set color-by-color in a step S42. If a background pixel is detected as a result, No in a step S42, the object pixel is not processed and a process of the next pixel starts. However, if a background pixel is detected, Yes in the step S42, the number of pixels P is counted from the object pixel to the background pixel by plane in a step S43, see FIGS. 11 and 12. A correcting coefficient (t1, t2 or t3) is then selected based on the value P, as in the second embodiment, in a step S44.

Since the correction is executed by using the determined correcting coefficient (t1, t2 or t3), it is possible to prevent toner from scattering around edge portions as in the second embodiment.

In the step S42, whether the object pixel is a non-background pixel is determined color-by-color (four planes for Y, M, C and K) based on a slash hold level (A), and whether the object pixel is a background pixel is determined color-by-color (four planes for Y, M, C and K) based on a slash hold level (B).

Figure 20A:
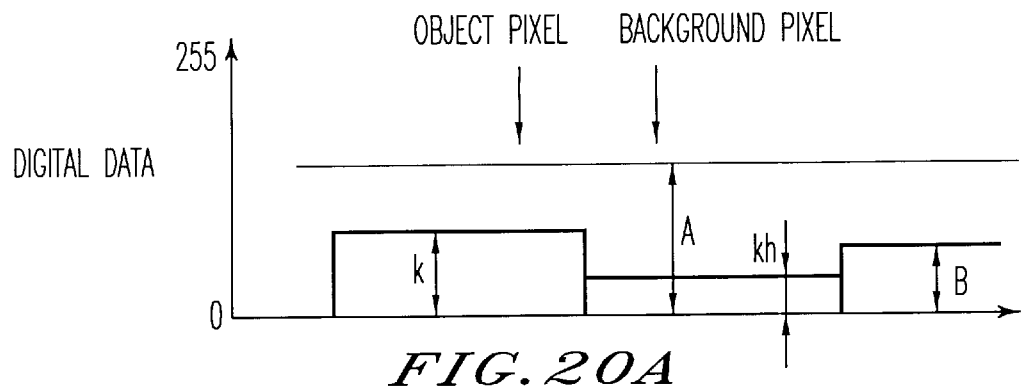
FIGS. 20(a) to 20(d) are diagrams showing a way of determining a background pixel and a non-background pixel based on a slash hold value according to the fourth embodiment.
Figure 20B:
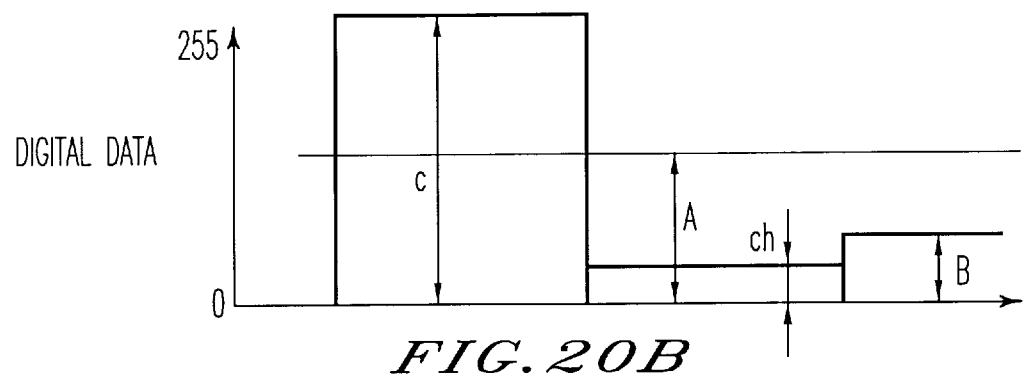
Figure 20C:
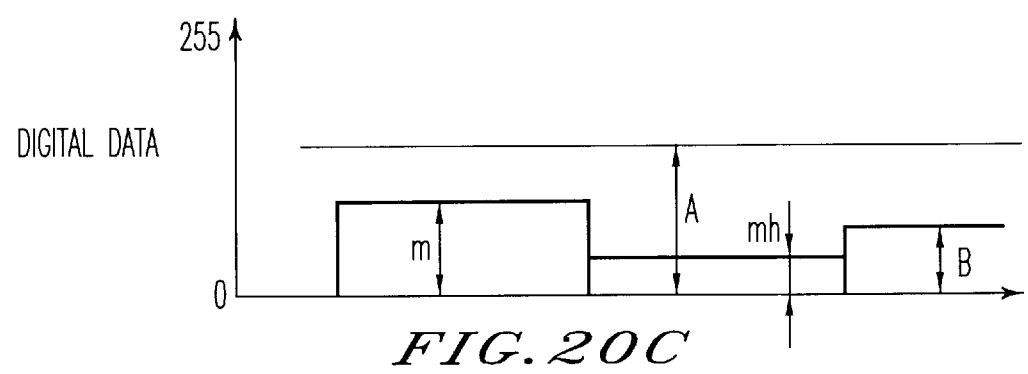
Figure 20D:
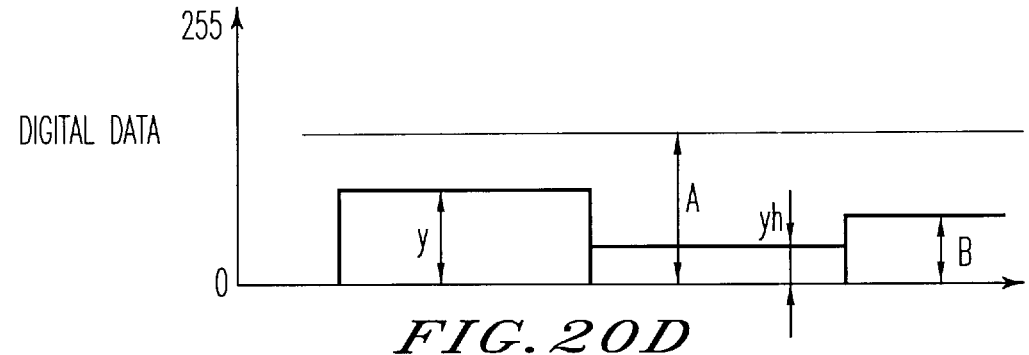
Figure 21A:
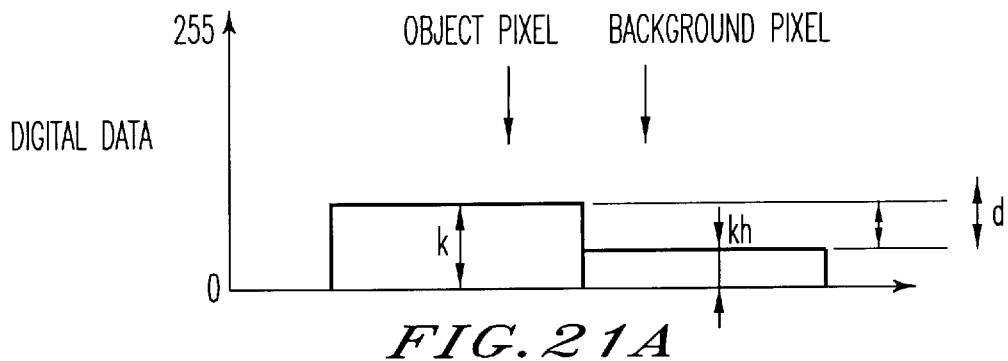
FIGS. 21(a) to 21(d) are diagrams showing a way of determining a background pixel and a non-background pixel based on a slash hold value according to the fourth embodiment.
Figure 21B:
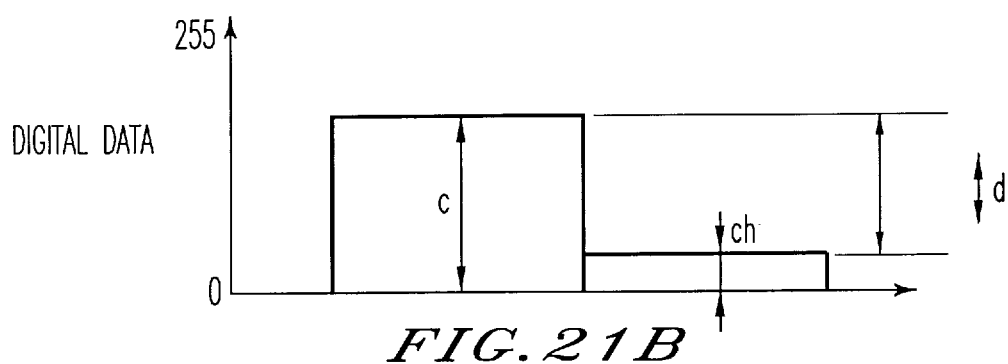
Figure 21C:
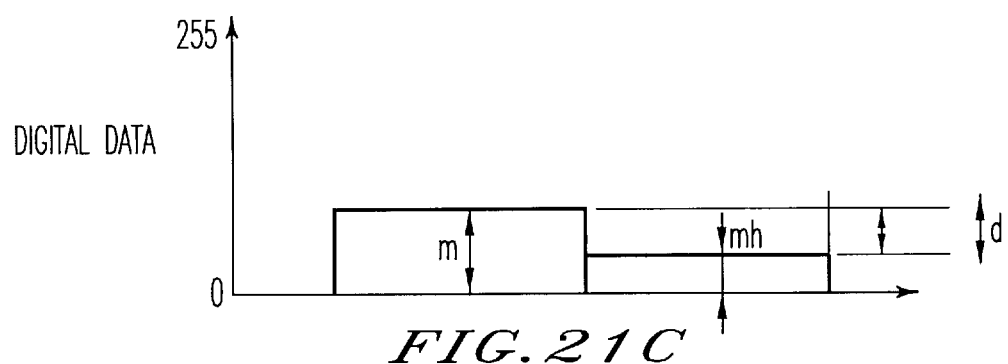
Figure 21D:
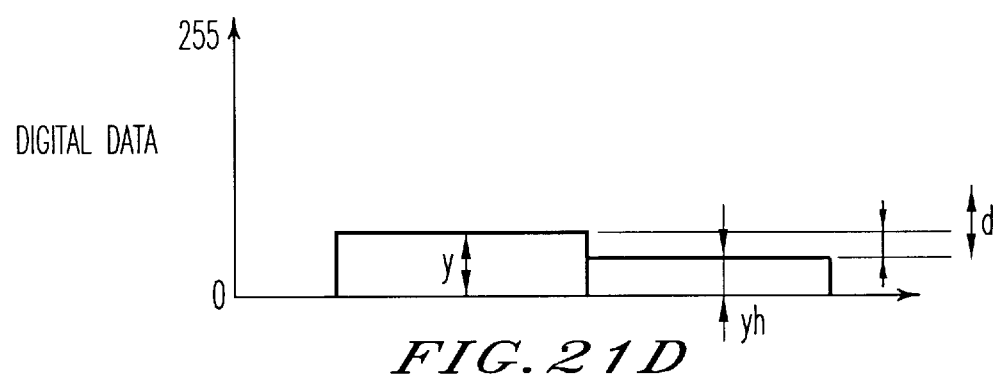

If digital data of one of the contacting pixels is greater than that of the slash hold level (A) and digital data of another of the pixels is smaller than that of the slash hold level (B), it is decided that the one pixel is a non-background pixel and the other pixel is a background pixel. If it is detected that the object pixel even in only one of the four colors is a non-background pixel, the correction process is accomplished at the object pixel. In the example of FIGS. 20(a) to 20(d), K (black) in FIG. 20(a), M (magenta) in FIG. 20(c) and Y (yellow) in FIG. 20(d) are not judged as a non-background pixel but C (cyan) in FIG. 20(b) is judged as a non-background pixel, and therefore the pixel is regarded as an object pixel.

Alternatively, as shown in FIG. 21, a difference ΔN between digital data of contacting pixels is compared with a slash hold level (d), and in case of ΔN>d, it is judged that there is a boundary of the background pixel and non-background pixel. If it is decided that there is a boundary even in only one of the four colors, it is efficient to carry out a correction process based on the result.

Figure 22:
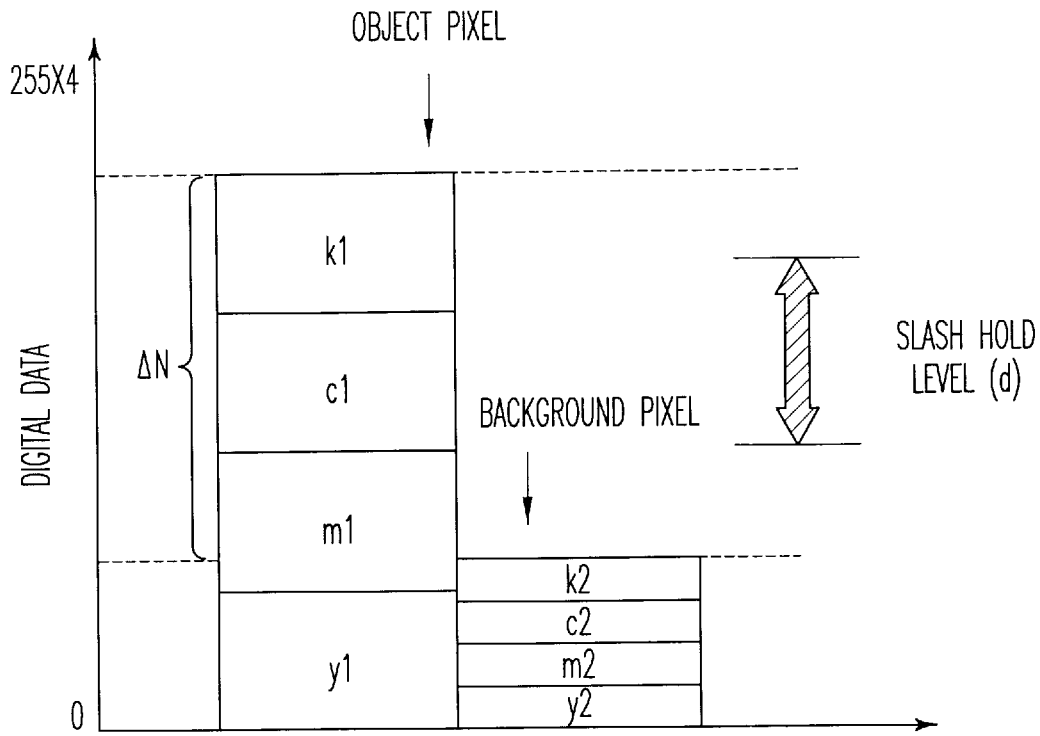
FIG. 22 is a diagram showing a way of determining a background pixel and a non-background pixel based on a slash hold value according to the fourth embodiment.
Figure 23:
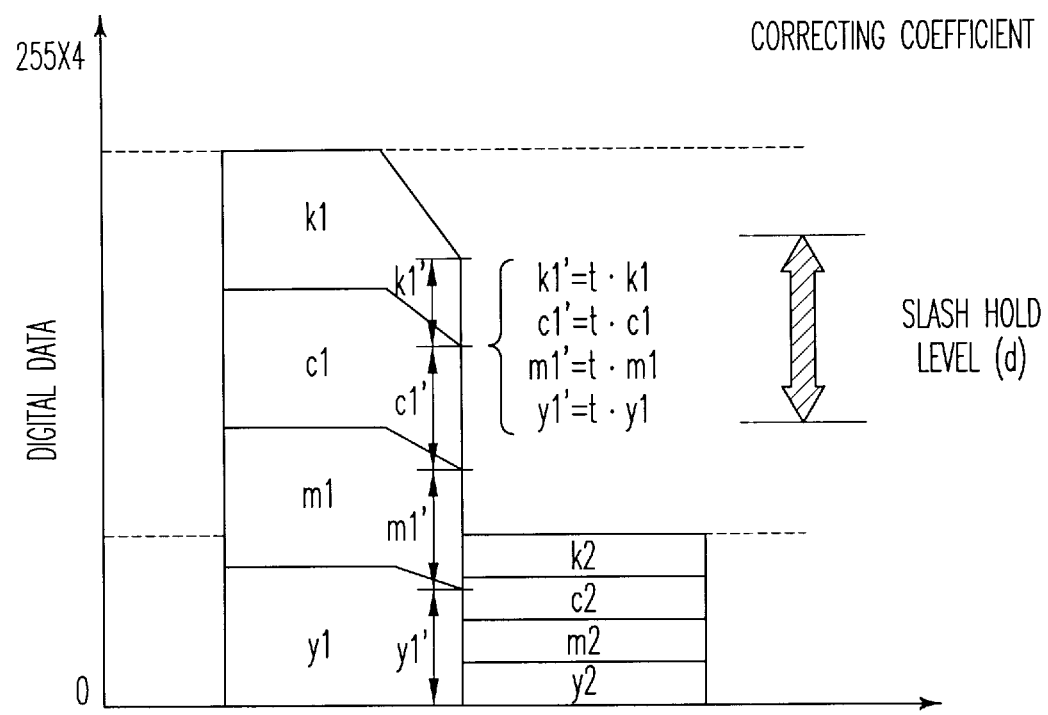
FIG. 23 is a diagram showing a state after correction according to the fourth embodiment.

As shown in FIG. 22, it is possible to compare the difference ΔN of a sum of digital data of four colors in contacting pixels with a slash hold level (d) and to detect that there is a boundary of the background pixel and non-background pixel in a case of ΔN>(d), and the correcting operation is carried out. In this case, it is possible to uniformly set correcting coefficients t for four colors and carry out all the four color corrections at the same time as shown in FIG. 23.

Figure 24:
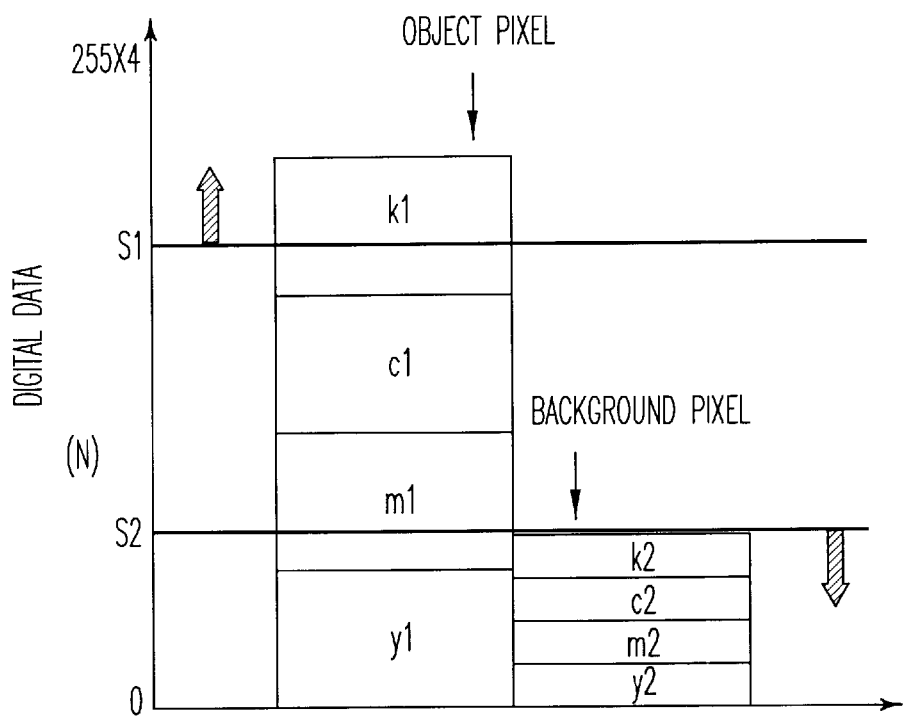
FIG. 24 is a diagram showing a way of determining a background pixel and a non-background pixel based on a slash hold value according to the fourth embodiment.
Figure 25:
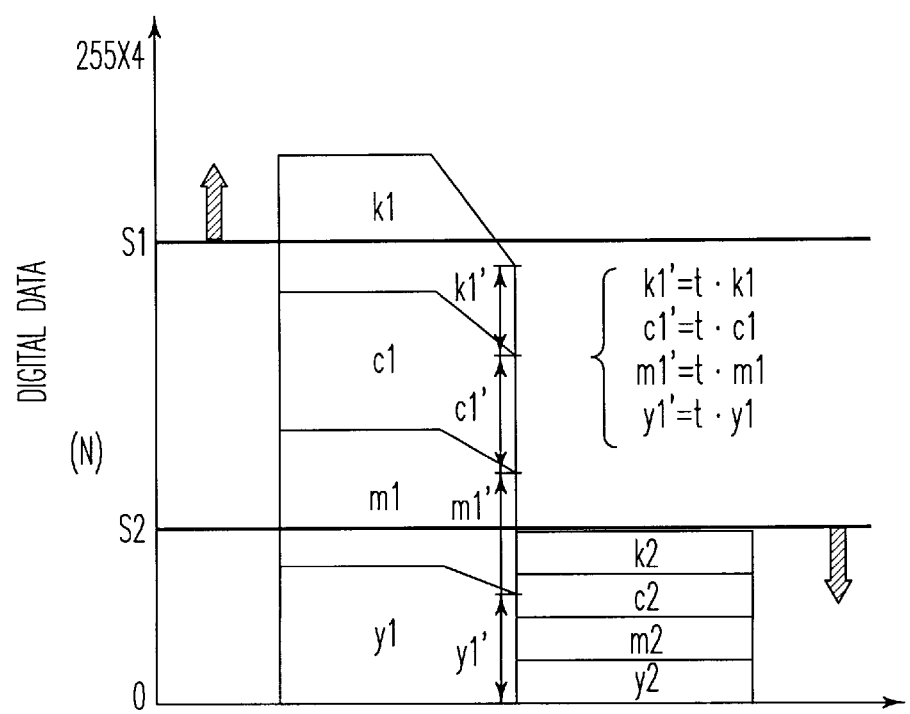
FIG. 25 is a diagram showing a state after correction according to the fourth embodiment.

Further, as shown in FIG. 24, when a sum (N) of digital data of the four colors in one of the contacting pixels is greater than a slash hold level (S1) (that is, N>S1) and a sum (N) of digital data of the four colors in another of the pixels is smaller than a slash hold level (S2) (that is, N<S2), it is possible to determine that the one of the pixels is a non-background pixel and the other is a background pixel, and then the correction process is accomplished. In this case, it is possible to correct all four color data as shown in FIG. 25 by uniformly setting a correcting coefficient t for the four colors. Accordingly, it is possible to accomplish the correcting process for four colors at the same time.

Next, a fifth embodiment of the present invention will now be explained.

Figure 26C:
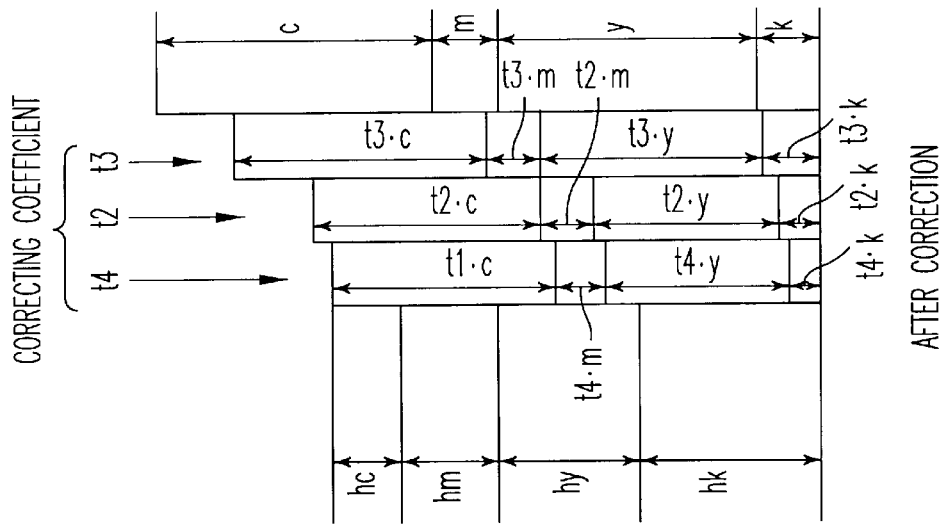
FIGS. 26 are diagrams showing states before, during and after correction according to a fifth embodiment of the present invention.
Figure 26B:
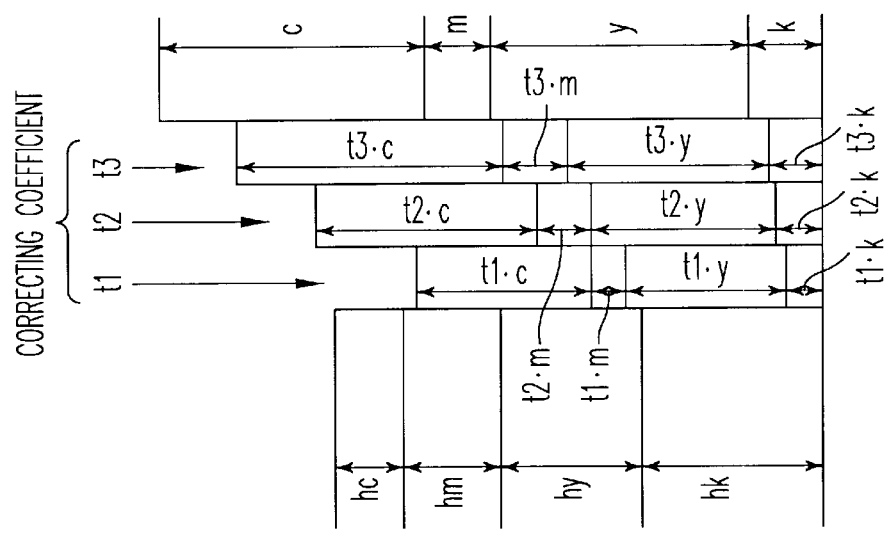

In the fourth embodiment, depending on combinations of a slash hold values and a coefficient, it can occur that the corrected result of the object pixel (non-background pixel) is smaller than a sum of digital data (hc+hm+hy+hk) of a background pixel, see FIG. 26(b).

To solve this problem, in the fifth embodiment, a pixel data converting unit 21f is added in an image processing unit 21 of the controller 30 in the fourth embodiment, similarly as in the third embodiment.

The pixel data converting unit 21f compares the corrected result of a non-background pixel with a background pixel and according to the result of the comparison, the pixel data converting unit 21f replaces digital data of the non-background pixel with a sum of four color digital data of the background pixel.

Figure 27:
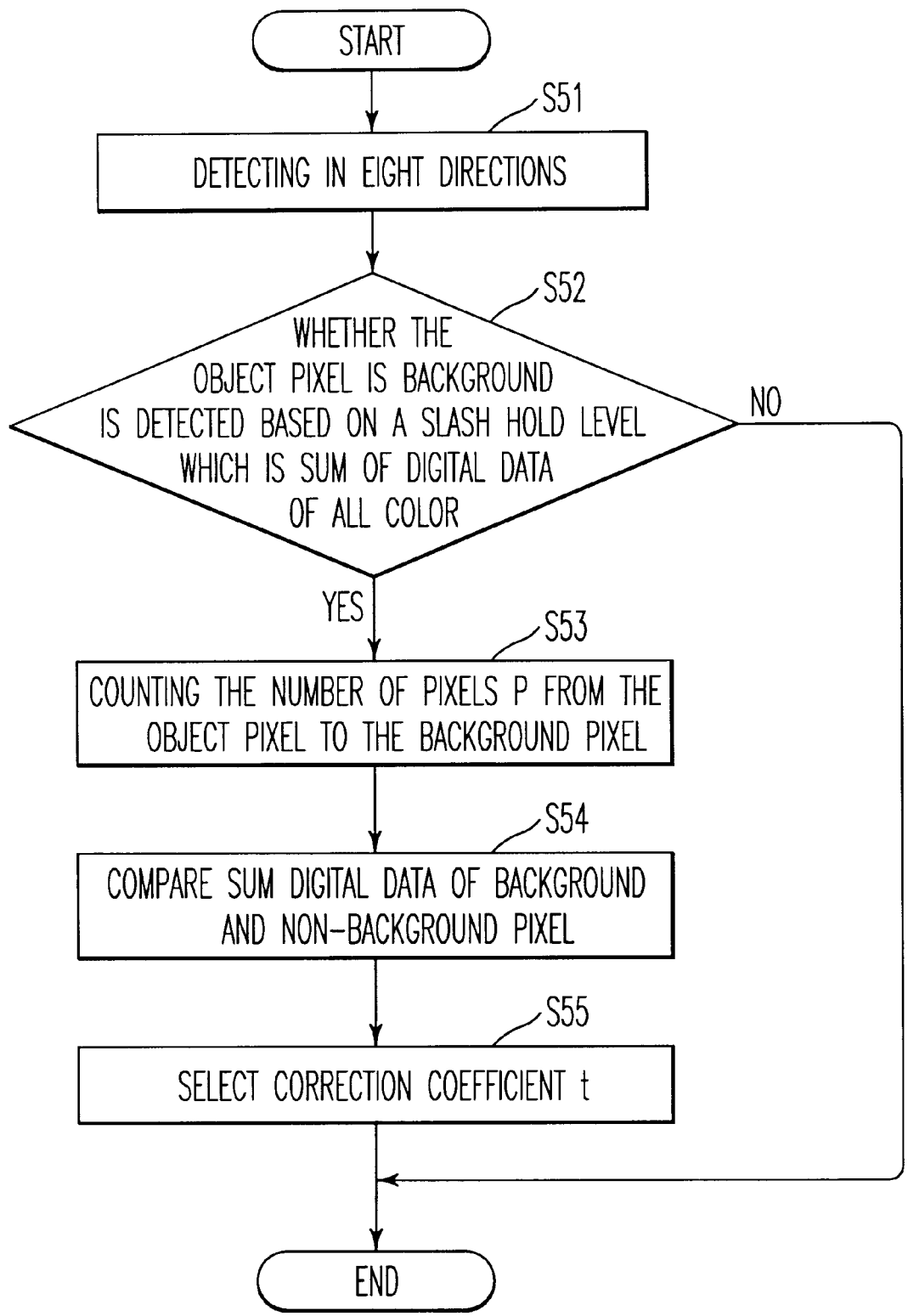
FIG. 27 is a flow chart showing a main operation according to the fifth embodiment.

FIG. 27 is a flow chart showing the process. Steps 51 to 53 in FIG. 27 correspond to steps 41 to 43 in FIG. 19 of the fourth embodiment. In step 54 of FIG. 27 following the steps S51 to S53, a sum (t1*c+t1*m+t1*y+t1*k) of digital data of a corrected result of a non-background pixel (object pixel) and a sum of digital data of a background pixel (hc+hm+hy+hk) are compared, and if (t1*c+t1*m+t1*y+t1*k) is smaller than (hc+hm+hy+hk), a correcting coefficient (t4) is determined so that the corrected non-background data is the same as the sum of digital data of the background in a step S55. In this case, the correcting coefficient (t4) is the same for four colors (C, M, Y and K).

FIG. 26(b) shows a state during the correction. In FIG. 26(b), the sum (t1*c+t1*m+t1*y+t1*k) of digital data of the correction result of the object pixel and the sum (hc+hm+hy+hk) of digital data of the background pixel are in relation as shown in a formula (1) below, but after the correction, as show in FIG. 26(c), the relation is as shown in formula (2) below.

$$(t1*c+t1*m+t1*y+t1*k)<(hc+hm+hy+hk) \quad (1)$$

$$(t4*c+t4*m+t4*y+t4*k)=(hc+hm+hy+hk) \quad (2)$$

Figure 26A:
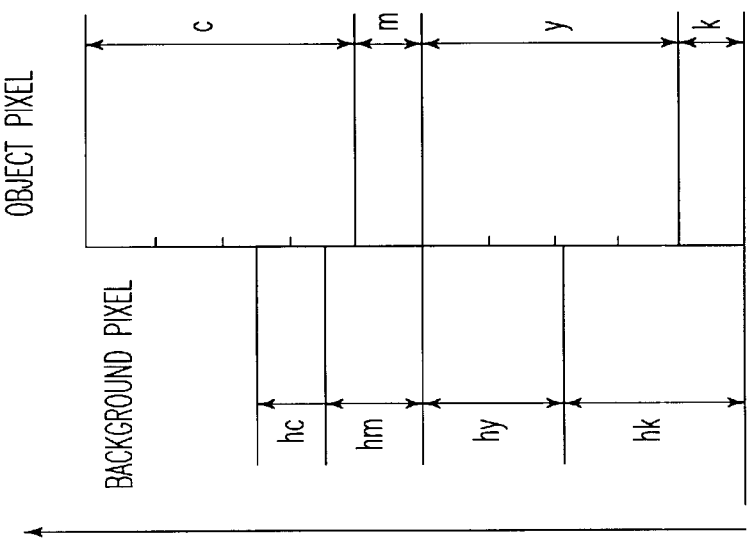

As shown in FIG. 26, it is possible to prevent the digital data of the object pixel from getting smaller than the value of digital data of the background pixel by the correction by adding the background processing step S54 and preventing the non-background pixel from getting lighter than that of the background pixel.

In the second to fifth embodiments, the correcting coefficients are determined by the number from the object pixel to the closest background pixel. However, degrees of toner scattering vary depending on an image width such as that of a line image or solid image. If a line image is corrected by using the same correcting coefficient for solid images, the correction may be too much, that is, the line image might be lost.

In a sixth embodiment of the present invention, a correction excluding unit 21a in the image processing unit 21 of the controller 30 in the second to fifth embodiment detects the line width presented by non-background pixels and if the width is smaller than a predetermined value, the non-background pixel is not corrected.

Further, in the sixth embodiment, the correcting unit 21d in the image processing unit 21 has a function that a correcting coefficient is determined based on whether the object pixel (a non-background pixel to be corrected) is part of a line image or solid image and what the pixel distance from a non-background pixel contacting a boundary to the object pixel is, i.e. how many pixels there are from the non-background pixel contacting the boundary to the object pixel.

Figure 28:
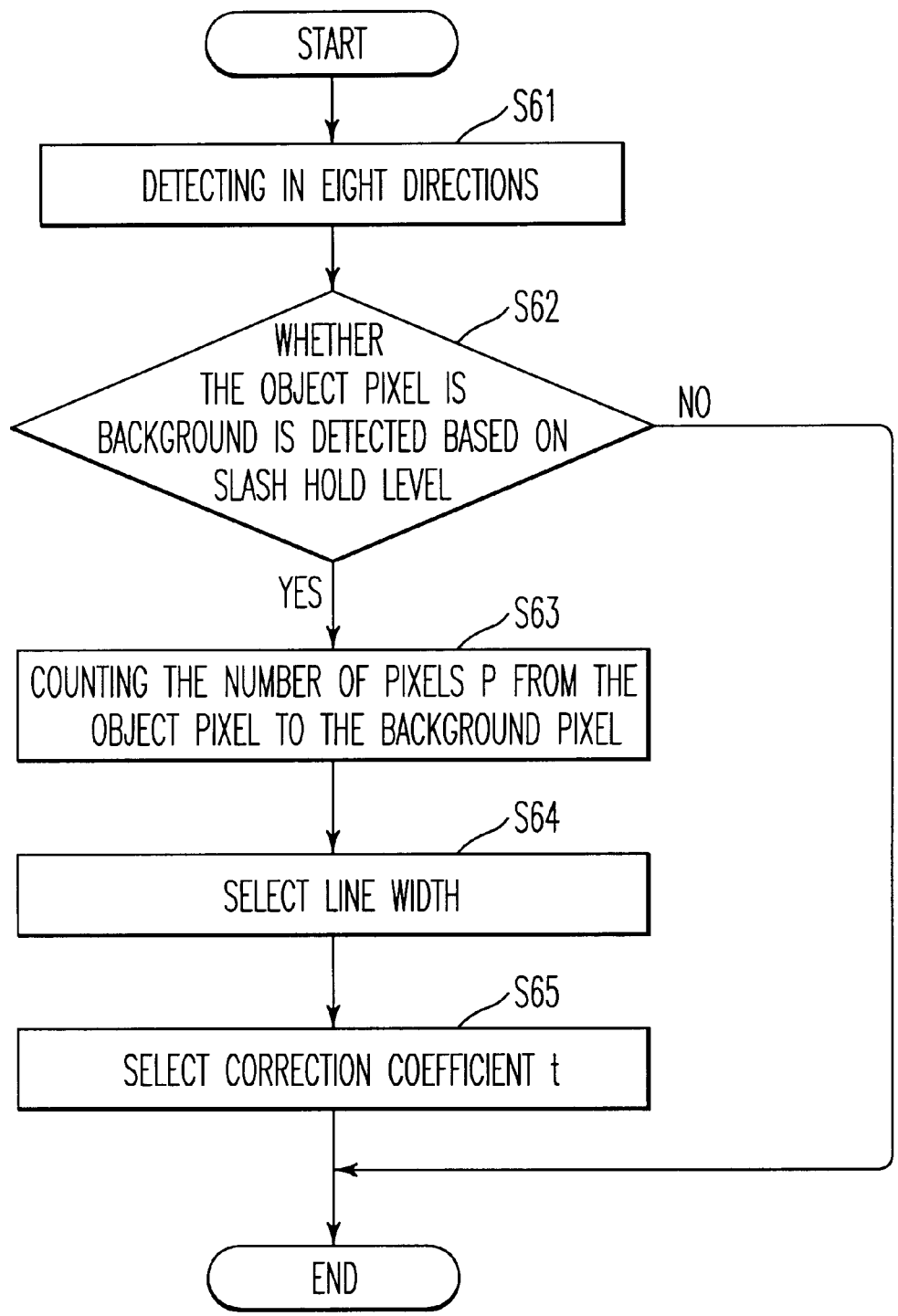
FIG. 28 is a flow chart showing a main operation according to a sixth embodiment of the present invention.

FIG. 28 is a flow chart showing a process according to the sixth embodiment. A side-by-side color image forming type of apparatus is used in the sixth embodiment.

In FIG. 28, pixel data in eight directions from the object pixel are detected in a step S61. For each pixel it is determined if the pixel is a background pixel or a non-background pixel in a step S62. If it is decided that the object pixel is not a background pixel, No in the step S62, no correcting process is performed at the object pixel and the next pixel is processed. If it is determined that the object pixel is a background pixel, Yes in the step S62, the pixel number P is counted from the object pixel to the closest background pixel in a step S63, and based on the result of counting, the line width Q is detected in a step S64. The line width is detected in four directions, and with reference to the directions shown in FIG. 10, "1–5", "2–6", "3–7" and "4–8"; "1–5" representing the direction along the axis connecting directions 1 and 5 in FIG. 10, etc.

For example, the line width Q in the direction "1–5" is obtained from the pixel number P1 from the object pixel to the background pixel in the direction "1" and the pixel number P5 from the object pixel to the background pixel in the direction "5". Whether the object pixel is part of a solid image or line image is determined from the thinnest line among those in the four directions in a step S64. If the object pixel is part of a solid line, a correcting coefficient (t1, t2, t3 or t4) is determined by the pixel number P obtained in the step S63. If the object pixel is part of a line image, a correcting coefficient is determined by the line width Q and the pixel number from the object pixel to the closest background pixel in a step S65.

For example, if the object pixel is part of the solid image and the pixel number is two from the object pixel to the background pixel, a correcting coefficient is determined as "t2", see FIG. 29(a). If the pixel number is one from the object pixel to the background pixel, the correcting coefficient is determined as "t1", see FIG. 29(b).

If the object pixel is in a two pixel width line image and the pixel number is one from the object pixel to the background pixel, the correcting coefficient is decided as "t12", see FIG. 29(c).

If the object pixel is in a three pixel width line image and the pixel number is one from the object pixel to the background pixel, the correcting coefficient is determined as "t13", see FIG. 29(d).

If the object pixel is in a three pixel width line image and the pixel number is two, a correcting coefficient is decided as "t23", see FIG. 29(e).

If the object pixel is in a four pixel width line image and the pixel number is one, a correcting coefficient is determined as "t14", see FIG. 29(f).

If the object pixel is in a four pixel width line image and the pixel number is two from the object pixel to the background pixel, a correcting coefficient is decided as "t24", see FIG. 29(g).

Degrees of correction get bigger as the numbers next to "t" of the correcting efficient get larger.

If the object pixel is in one pixel width line image, a correcting coefficient is decided as "t" (Maximum value), that is, the object pixel is not corrected.

Whether the object pixel (a non-background pixel to be corrected) is part of a line or solid image is determined, and if the object pixel is in the solid image, the correcting coefficient is decided based on how many pixels there are from the non-background pixel contacting the boundary of the background pixel. If the object pixel is in the line image, the correcting coefficient is determined based on the line width and the pixel distance from the non-background pixel contacting the boundary to the object pixel.

With this Operation, it is possible to obtain a natural and clear image with high quality without toner scattering. Further, it is possible to prevent line images from disappearing or being cut down.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the Unites States is:

1. A color image forming apparatus comprising:
   an image paper sheet for compensation including a testing image generated from an original image for testing, the testing image including a line image;
   a line width extracting means for reading color-by-color for a plurality of colors line widths of the testing image from the image paper sheet for compensation and extracting information of a state of toner scattering around edge portions of the line image;
   calculating means for calculating color-by-color correcting data based on the color-by-color extracted information; and
   line width cor recting means for correcting the toner scattering based on a result calculated by said calculating means for subsequent image forming operations.

2. A color image forming apparatus according to claim 1, further comprising an image storing memory storing said original image for testing.

3. A color image forming apparatus according to claim 2, wherein said original image for testing is a printed paper sheet for testing.

4. A color image forming apparatus according to claim 2, wherein said original image for testing is a recording medium storing code information.

5. A color image forming apparatus according to claim 1, wherein said line width correcting means reduces toner amount around edge portions of line images so as to prevent toner from scattering around the edge portions.

6. A color image forming apparatus according to claim 2, wherein said line width correcting means reduces toner amount around edge portions of line images so as to prevent toner from scattering around the edge portions.

7. A color image forming apparatus according to claim 3, wherein said line width correcting means reduces toner amount around edge portions of line images so as to prevent toner from scattering around the edge portions.

8. A color image forming apparatus according to claim 4, wherein said line width correcting means reduces toner amount around edge portions of line images so as to prevent toner from scattering around the edge portions.

9. A color image forming apparatus according to claim 5, wherein said line width correction means includes a plurality of correction patterns and reduces toner amount around edge portions based on selecting one of said plurality of correction patterns for the subsequent image forming operations.

10. A color image forming apparatus according to claim 6, wherein said line width correction means includes a plurality of correction patterns and reduces toner amount around edge portions based on selecting one of said plurality of correction patterns for the subsequent image forming operation.

11. A color image forming apparatus according to claim 9, wherein said one of said plurality of correction patterns is selected based on characteristics of a read image.

12. A color image forming apparatus according to claim 10, wherein said one of said plurality of correction patterns is selected based on characteristics of a read image.

13. A color image forming apparatus comprising:
    correction excluding means for excluding at least one predetermined color data of an object pixel from a correction operation;
    boundary detecting means for detecting a boundary of a background pixel and a non-background pixel;
    object pixel detecting means for detecting a distance from the background pixel to the object pixel; and
    correcting means for correcting the object pixel based on a result of the detected distance from the background pixel to the object pixel detected by said object pixel detecting means.

14. A color image forming apparatus according to claim 13, further comprising pixel data converting means for comparing a result corrected by said correcting means and data of the non-background pixel and replacing data of the object pixel with said data of the non-background based on a result of the comparison.

15. A color image forming apparatus according to claim 13, further comprising line width detecting means for detecting a width of a line image, and wherein the object pixel is not corrected if the object pixel is in a line image having a width smaller than a predetermined value.

16. A color image forming apparatus according to claim 14, further comprising line width detecting means for detecting a width of a line image, and wherein the object pixel is not corrected if the object pixel is in a line image having a width smaller than a predetermined value.

17. A color image forming apparatus according to claim 13, wherein a color image is formed by a side-by-side color image forming type of apparatus.

18. A color image forming apparatus according to claim 14, wherein a color image is formed by a side-by-side color image forming type of apparatus.

19. A color image forming apparatus according to claim 13, wherein a color image is formed by a color toner laying type of apparatus.

20. A color image forming apparatus according to claim 14, wherein a color image is formed by a color toner laying type of apparatus.

* * * * *